United States Patent
Kumar et al.

(10) Patent No.: US 8,813,690 B2
(45) Date of Patent: Aug. 26, 2014

(54) ENGINE CONTROL TECHNIQUES TO ACCOUNT FOR FUEL EFFECTS

(75) Inventors: Shankar Kumar, Columbus, IN (US); Timothy R. Frazier, Columbus, IN (US); Donald W. Stanton, Columbus, IN (US); Yi Xu, Media, PA (US); Bruce G. Bunting, Knoxville, TN (US); Leslie R. Wolf, Naperville, IL (US)

(73) Assignee: Cummins Inc., Columbus, IN (US)

( * ) Notice: Subject to any disclaimer, the term of this patent is extended or adjusted under 35 U.S.C. 154(b) by 625 days.

(21) Appl. No.: 12/916,872

(22) Filed: Nov. 1, 2010

(65) Prior Publication Data

US 2011/0160982 A1   Jun. 30, 2011

Related U.S. Application Data

(60) Provisional application No. 61/256,725, filed on Oct. 30, 2009, provisional application No. 61/256,471, filed on Oct. 30, 2009.

(51) Int. Cl.
   *F02B 75/12* (2006.01)

(52) U.S. Cl.
   USPC .......................................... 123/1 A; 60/274

(58) Field of Classification Search
   CPC .................................................... F02B 1/04
   USPC ............ 123/1 A, 434, 674, 680, 703; 60/274, 60/284, 285, 286
   See application file for complete search history.

(56) References Cited

U.S. PATENT DOCUMENTS

| | | | |
|---|---|---|---|
| 5,381,767 A | 1/1995 | Kikuchi | |
| 5,469,831 A | 11/1995 | Takahashi | |
| 7,096,123 B1 | 8/2006 | McAdams et al. | |
| 7,208,022 B2 * | 4/2007 | Corkwell et al. | 44/331 |
| 7,467,615 B2 * | 12/2008 | Siewert | 123/299 |
| 7,487,663 B2 | 2/2009 | Sobotowski et al. | |
| 8,193,402 B2 * | 6/2012 | Gruber et al. | 585/240 |
| 8,256,281 B2 * | 9/2012 | Nishiumi | 73/114.49 |
| 8,307,695 B2 | 11/2012 | Miyaura et al. | |
| 8,387,367 B2 * | 3/2013 | Houel et al. | 60/285 |
| 2008/0155887 A1 * | 7/2008 | Clark et al. | 44/300 |
| 2011/0099979 A1 | 5/2011 | Xu et al. | |
| 2011/0265773 A1 * | 11/2011 | Xu et al. | 123/703 |

FOREIGN PATENT DOCUMENTS

| | | |
|---|---|---|
| DE | 43 01 580 A1 | 7/1993 |
| EP | 1 353 177 A2 | 10/2003 |
| EP | 1 445 455 A2 | 8/2004 |

OTHER PUBLICATIONS

International Search Report and Written Opinion, PCT/US2010/054953, Cummins, Inc., The International Searching Authority/EP, Feb. 15, 2011.

* cited by examiner

*Primary Examiner* — John Kwon

(74) *Attorney, Agent, or Firm* — Krieg DeVault LLP

(57) ABSTRACT

A technique for engine control to account for fuel effects including providing an internal combustion engine and a controller to regulate operation thereof, the engine being operable to combust a fuel to produce an exhaust gas; establishing a plurality of fuel property inputs; establishing a plurality of engine performance inputs; generating engine control information as a function of the fuel property inputs and the engine performance inputs; and accessing the engine control information with the controller to regulate at least one engine operating parameter.

28 Claims, 29 Drawing Sheets

ENGINE CONTROL TECHNIQUES TO ACCOUNT FOR FUEL EFFECTS

CROSS-REFERENCE TO RELATED APPLICATION

The present application claims the benefit of U.S. Provisional Patent Application No. 61/256,725 filed Oct. 30, 2009, which is hereby incorporated by reference in its entirety. The present application is related to U.S. Provisional Patent Application No. 61/256,471 filed Oct. 30, 2009, which is also hereby incorporated by reference in its entirety.

GOVERNMENT RIGHTS

The present invention was made with Government assistance from the U.S. Department of Energy (DOE) under contract No. DE-FC26-05NT42418. The U.S. Federal Government may have certain rights therein.

BACKGROUND

The present application generally relates to engine control techniques, and more specifically, but not exclusively, relates to internal combustion engine adjustments to account for salient fuel characteristics.

Fuel properties impact the performance and emissions behavior of internal combustion engines. These impacts are of particular interest for diesel-fueled, reciprocating piston-type internal combustion engines because of the frequent influence on the physical process associated with jet penetration, entrainment, fuel-air mixing, and/or changes to the combustion chemistry associated with fuel composition. Also, there remains a continued focus on ultra-low Nitrogen Oxides (NOx) emissions targets for diesel engines. Fuel property fluctuations, such as that posed by the typical range of variation across the world-wide market, can pose difficulties in meeting such targets and/or adversely impact fuel efficiency or the like.

Several studies have been conducted in the past to assess the effect of diesel fuel property changes on engine-out emissions. Many of these studies suggest conflicting results on the directional influences of fuel properties on engine behavior, some of which is explained by the significant differences in NOx levels and engine operating conditions under which the data was gathered. The problem may be compounded by the typically high degree of confounding between fuel properties, which can make it difficult to isolate individual effects. Generally, the existing studies point to some inherent challenges in characterizing fuel effects on engine behavior and the extent to which operating conditions and the combustion system may influence the relative trends. Further, while sometimes identifying influential fuel properties in a qualitative sense, quantifying the relative significance of each of these properties on a wide range of diesel engines continues to pose difficulties.

Also, while there has been some focus regarding fuel effects for high NOx engines and Homogenous Charge Compression Ignition (HCCI) systems, understanding is limited in regard to advanced ultra-low NOx combustion systems which do not employ HCCI combustion technology and/or that use Ultra Low Sulfur Diesel (ULSD) (<15 ppm sulphur content). Moreover, there remains a need for engine control systems that account for fuel effects in the face of various emission and/or or efficiency constraints for these types of systems and others. Accordingly, there is a demand for further contributions in this area of technology.

SUMMARY

One embodiment of the present application provides a unique engine control technique. Other embodiments include unique internal combustion engine apparatus, systems, devices, and methods. Further embodiments, forms, objects, features, advantages, aspects, embodiments and benefits shall become apparent from the following descriptions, drawings, and claims.

DETAILED DESCRIPTION OF REPRESENTATIVE EMBODIMENTS

Figure 1:
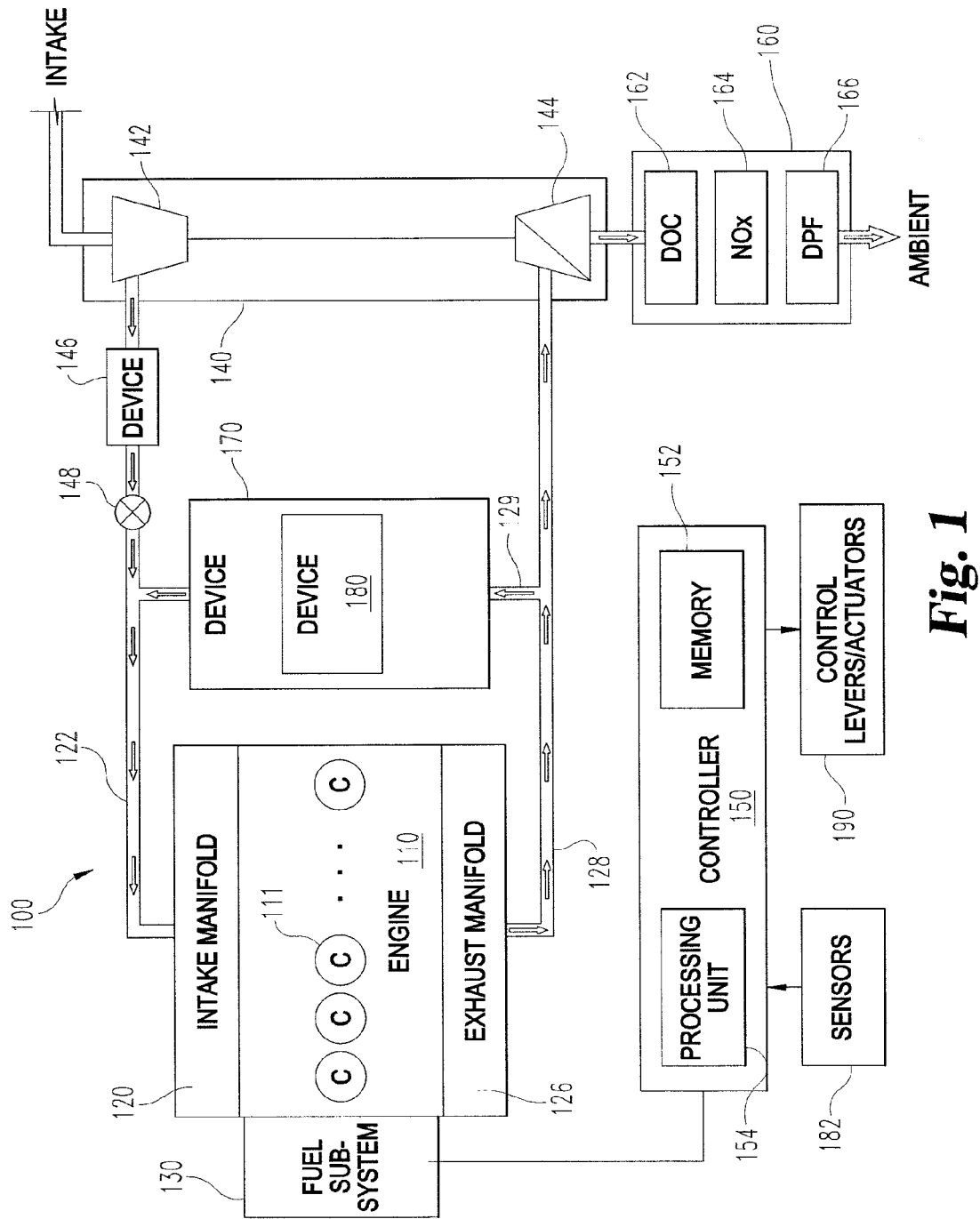
FIG. 1 is a diagrammatic view of an internal combustion engine system that may be configured to account for fuel effects.

For the purposes of promoting an understanding of the principles of the invention, reference will now be made to the embodiment illustrated in the drawings and specific language will be used to describe the same. It will nevertheless be understood that no limitation of the scope of the invention is thereby intended, any alterations and further modifications in the disclosed inventions and embodiments of the present application, and any further applications of the principles of the inventions and embodiments disclosed herein are contemplated as would normally occur to one skilled in the art.

FIG. 1 illustrates internal combustion engine system 100. System 100 includes an internal combustion engine 110 of the reciprocating piston type having one or more reciprocating pistons 111 journaled to a crankshaft (not shown). In one form, engine 110 is of the four-stroke, diesel-fueled type with compression ignition and fuel injection. Each piston 111 reciprocates in a corresponding cylinder C during operation. In other embodiments, engine 110 can be of a spark-ignited type, the two-stroke type, a rotary type such as a gas turbine engine, and/or may not utilize any form of fuel injection, to name just a few alternative possibilities. Furthermore, other embodiments may be fueled differently. System 100 may be used to provide power to mobile applications such as vehicles or stationary applications such as electrical power generators, pumps, and the like. In addition, system 100 may be used in hybrid applications that include one or more power sources in addition to engine 110, such as batteries or fuel cells—to name a couple of examples.

Engine 110 is fluidly coupled to an intake manifold 120 to receive air for combustion and an exhaust manifold 126 to discharge exhaust from engine 110. Intake manifold 120 is in fluid communication with an intake passageway 122. Exhaust manifold 126 is in fluid communication with an exhaust passageway 128. System 100 further includes a turbocharger 140 with a compressor 142 driven by a variable geometry turbine 144. Turbine 144 is powered by exhaust from engine 110 flowing through exhaust passageway 128 to an exhaust aftertreatment system 160. Turbocharger 140 may be a single variable geometry type, but other types and/or numbers of turbochargers may be utilized as well. Alternatively, in other embodiments turbocharger 140 may be absent. Also, system 100 includes an Exhaust Gas Recirculation (EGR) system 170 in fluid communication with both intake passageway 122 and exhaust passageway 128. EGR system 170 includes a standard EGR cooler 180 in selective fluid communication with passageways 122 and 128. Engine 110 is regulated by a controller 150. Controller 150 is operatively connected to a number of sensors 182, such as various temperature, pressure, gas-flow rate, and oxygen detectors to monitor engine performance, and a number of actuators 190, such as controllable valves, fuel injectors, and the like to adjust operation of engine 110 in response to various inputs.

Controller 150 includes memory 152 and at least one processing unit 154. Typically, controller 150 is in the form of a standard type of Engine Control Module (ECM), including one or more types of memory 152. Controller 150 can be an electronic circuit comprised of one or more components, including digital circuitry, analog circuitry, or both. Controller 150 may be a software and/or firmware programmable type; a hardwired, dedicated state machine; or a combination of these. In one embodiment, controller 150 is a programmable microcontroller solid-state integrated circuit that integrally includes one or more processing units 154 and memory 152. Memory 152 can be comprised of one or more components and can be of any volatile or nonvolatile type, including the solid state variety, the optical media variety, the magnetic variety, a combination of these, or such different arrangement as would occur to those skilled in the art. Further, when multiple processing units 154 are present, controller 150 can be arranged to distribute processing among such units, and/or to provide for parallel or pipelined processing if desired. Controller 150 functions in accordance with operating logic defined by programming, hardware, or a combination of these. In one form, memory 152 stores programming instructions executed by a processing unit 154 of controller 150 to embody at least a portion of this operating logic. Alternatively or additionally, memory 152 stores data that is manipulated by the operating logic of controller 150. Controller 150 can include signal conditioners, signal format converters (such as analog-to-digital and digital-to-analog converters), limiters, clamps, filters, and the like as needed to perform various control and regulation operations described in the present application. Controller 150 receives various inputs and generates various outputs to perform certain operations in accordance with its operating logic, as described hereinafter.

During engine 110 operation, ambient air is inducted from the atmosphere and is compressed by compressor 142 of turbocharger 140 to produce a pressurized charge air. In addition to raising pressure, compression typically raises the temperature of the charge air. For the depicted embodiment, a cooling device 146 is included to cool the charge air before supplying it to engine 110. The compressed charge air is supplied to engine 110 through intake manifold 120 that is in fluid communication with engine 110. An air intake throttle valve 148 is positioned between compressor 142 and engine 110 that is operable to control the amount of charge air that reaches engine 110 from compressor 142. Air intake throttle valve 148 is operatively connected to and controlled by controller 150 (not shown), but may be controlled by other control devices as well. In other embodiments, air intake throttle valve 148 may be absent.

The charge air is selectively mixed with exhaust gas from EGR system 170 and is then provided to intake manifold 120. EGR system 170 may be used to reduce the amount of NOx produced during combustion. EGR cooler 180 may be in the form of one or more liquid, charge air, and/or other types of cooling devices structured to cool the exhaust gas before being supplied to the intake side of engine 110 with the compressed charge air from air intake throttle valve 148. Furthermore, it is contemplated that high pressure loop EGR systems, low pressure loop EGR systems, multiple loop EGR systems and variations thereof may be used—while in other arrangements EGR may be altogether absent.

The charge air is mixed with fuel from fuel subsystem 130 to provide a combustible charge in each cylinder C in accordance with fuel timing control logic executed by controller 150. Typically fuel is injected with an electronically controlled injector during a number of injection stages. In one form with multiple injection stages, there is a main stage injection pulse of fuel with at least one pilot injection stage beforehand, and/or at least one post injection stage separated in time from the main stage. This separation is typically expressed in degrees relative to the Top Dead Center (TDC) position of piston 111 in the cylinder C to which the fuel is being provided. In addition to fuel injection timing, fuel amount may also be electronically regulated with controller 150. The air/fuel charge is ignited in each cylinder C to produce mechanical power. Exhaust gases produced by combustion in engine 110 are discharged through exhaust manifold 126 connected with engine 110. Under typical operating conditions, a portion of the exhaust gas is routed through aftertreatment system 160 and a portion is routed through EGR system 170. The exhaust also impinges on turbine 144 to drive compressor 142 of turbocharger 140.

Exhaust aftertreatment system 160 includes a diesel oxidation catalyst unit 162, an adsorber which is preferably a NOx adsorber or lean NOx trap 164 but could be other types of adsorbers or other NOx emissions control devices, and a diesel particulate filter 166. Exhaust aftertreatment system 160 is operable to reduce unwanted emissions from exhaust gas exiting engine 110 after combustion. In other embodiments, some or all of these components may differ as would occur to those skilled in the art, may be in a different order relative to exhaust flow, may include additional aftertreatment components, or may be absent.

For the illustrated embodiment of FIG. 1, diesel oxidation catalyst unit 162 is configured as a flow device with a substrate carrying a catalyst. The catalyst typically includes one or more types of catalytic metals. As exhaust gas from engine 110 traverses diesel oxidation catalyst unit 162, heat, carbon monoxide, molecular hydrogen, and/or radical HydroCarbons (HCs) may be formed that assist with the operation of NOx adsorber 164. Also, some nitrogen monoxide may be converted into nitrogen dioxide, which is more readily stored by adsorber 164. In one form, controller 150 provides for the injection of fuel in engine 110 with such timing/quantity that at least some of it reaches system 160 to be used as a reactant (sometimes called in-cylinder dosing).

Relative to the exhaust stream, NOx adsorber 164 is positioned downstream of diesel oxidation catalyst unit 162 and is operable to adsorb NOx and SOx emitted from engine 110 to reduce their emission into the atmosphere. NOx adsorber 164 includes catalyst material to store NOx and SOx and selectively purge them after reaching a certain storage capacity (a regeneration of adsorber 164). Under nominal conditions, the stored material is discharged in a different molecular form than the undesired emissions being reduced—for instance, nitrogen in NOx is typically converted and discharged as $N_2$ during regeneration.

Diesel particulate filter 166 may include one or more of several types of particle filters. Diesel particulate filter 166 is utilized to capture unwanted diesel particulate matter from the flow of exhaust gas exiting engine 110 that corresponds to "smoke" in the exhaust stream. Diesel particulate matter may include sub-micron size particles found in diesel exhaust, including both solid and liquid particles, as well as fractions such as inorganic carbon (soot), organic fraction (often referred to as SOF or VOF), and sulfate fraction (hydrated sulfuric acid). Diesel particulate filter 166 may be regenerated at regular intervals by combusting particulates collected in diesel particulate filter 166. Regeneration of diesel particulate filter 166 is achieved through temperature control of the exhaust with other components of aftertreatment system 160, EGR system 170, fueling subsystem 130 and/or turbocharger 140. In other arrangements, system 160 may be of a different type, such as a Selective Catalytic Reduction (SCR) type, that includes external dosing with urea or the like, may include fewer aftertreatment components/stages/types of emission reduction, or may be absent altogether.

System 100 can be implemented with various control/regulation strategies to account for fuel effects. In one form, this implementation is embodied, at least in part, in the operating logic executed by controller 150. It has been surprisingly discovered that fuel effects and various engine operating characteristics can be usefully modeled in relation to a selected engine parameter or response of interest in accordance with the following expression (1):

$$\text{Engine response[NOx,Smoke,gisfc,bsfc,Exhaust temp.,etc]} = f_1(\text{engine control levers}) + f_2(\text{fuel properties}). \quad (1)$$

In expression (1), the engine response is the sum of the functions $f_1$ and $f_2$, and may include NOx content of exhaust; smoke (soot) content of exhaust; a fuel consumption measure, such as gross indicated fuel consumption (gisfc) or brake specific fuel consumption (bsfc); an engine gas temperature such as exhaust temperature; an engine gas pressure such as engine differential pressure; peak cylinder pressure (pcp); exhaust manifold temperature; combustion noise; Unburned HydroCarbon (UHC); crank angle for 50% cumulative heat release (CA50); and/or an engine gas flow rate—to name just a few examples among others. Non-limiting examples of engine control levers or "engine controls" include one or more of: injected fuel amount, number and timing of injection stages, a ratio between air and fuel, a fuel rail pressure, an engine gas temperature, an engine gas pressure, an engine gas flow, oxygen content of intake air and/or at another point along the working fluid path, engine speed, and engine load. Examples of fuel characteristics include, but are not limited to: distillation temperature of the fuel (such as mid-distillation temperature, T50), a cetane number of the fuel, a distillation slope for the fuel, aromatic content of the fuel, density of the fuel, and heating value of the fuel.

Using expression (1), various regression models were developed for relevant performance and emissions parameters following experiments varying engine control settings and fuel properties, as further described in the subsequent experimental results section of the present application and elsewhere herein. These experiments tested eleven different diesel fuel blends conducted at an emissions and fuel economy "cruise" condition (representing a key modal point in the EPA Federal Test Procedure 75 (FTP75) test cycle).

In modeling the engine behavior through a form indicated by expression (1), the correlation of the regression terms contained in functions 1 and 2 ($f_1$ and $f_2$, respectively) have been considered. Correlation, aliasing, and/or colinearity indicates a linear relationship between two variables under consideration. Correlated or collinear terms in a regression equation can pose difficult-to-solve or unsolvable singularity problems for the intermediate matrices calculated to determine the fit coefficients (owing to the matrices not being orthogonal). While generally, engine control terms for function $f_1$ are not correlated, expected inter-relationships between various fuel properties lead to the likelihood that certain fuel property terms in $f_2$ may be correlated and/or collinear. Accordingly, those fuel properties that are orthogonal and have the least amount of correlation are typically of greater interest when applying expression (1). Generally, fuel properties are correlated owing to the coupled relationships between physical features like cetane number and distillation characteristics with chemical attributes such as aromatics content. Owing to the presence of hundreds of hydrocarbon species, using merely a chemical type and molecular size to characterize a given fuel can be difficult.

Figure 2:
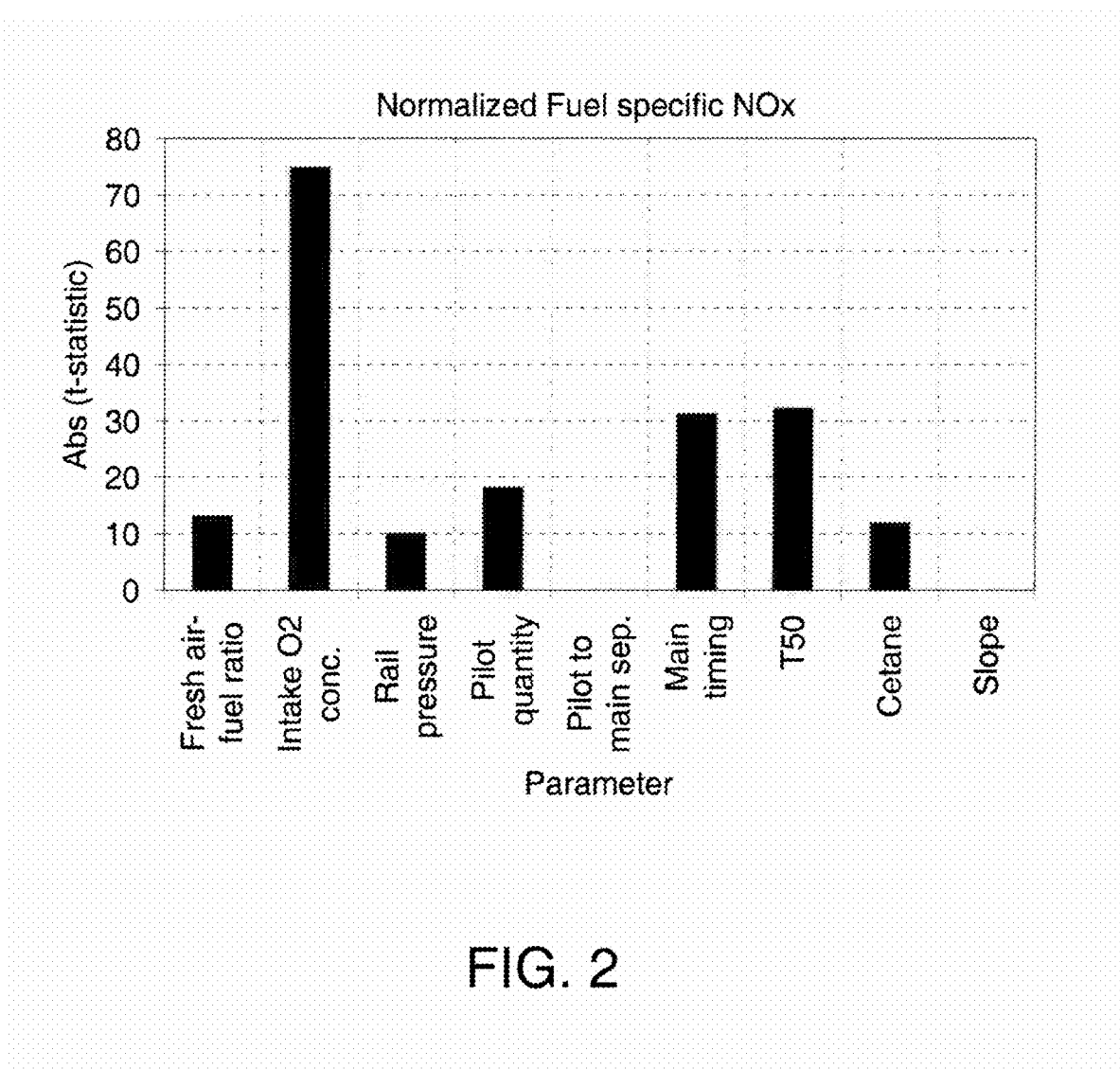
FIGS. 2-4 are graphs depicting the absolute t-statistic against their respective engine or fuel parameters for models of NOx, smoke and gisfc, respectively.
Figure 3:
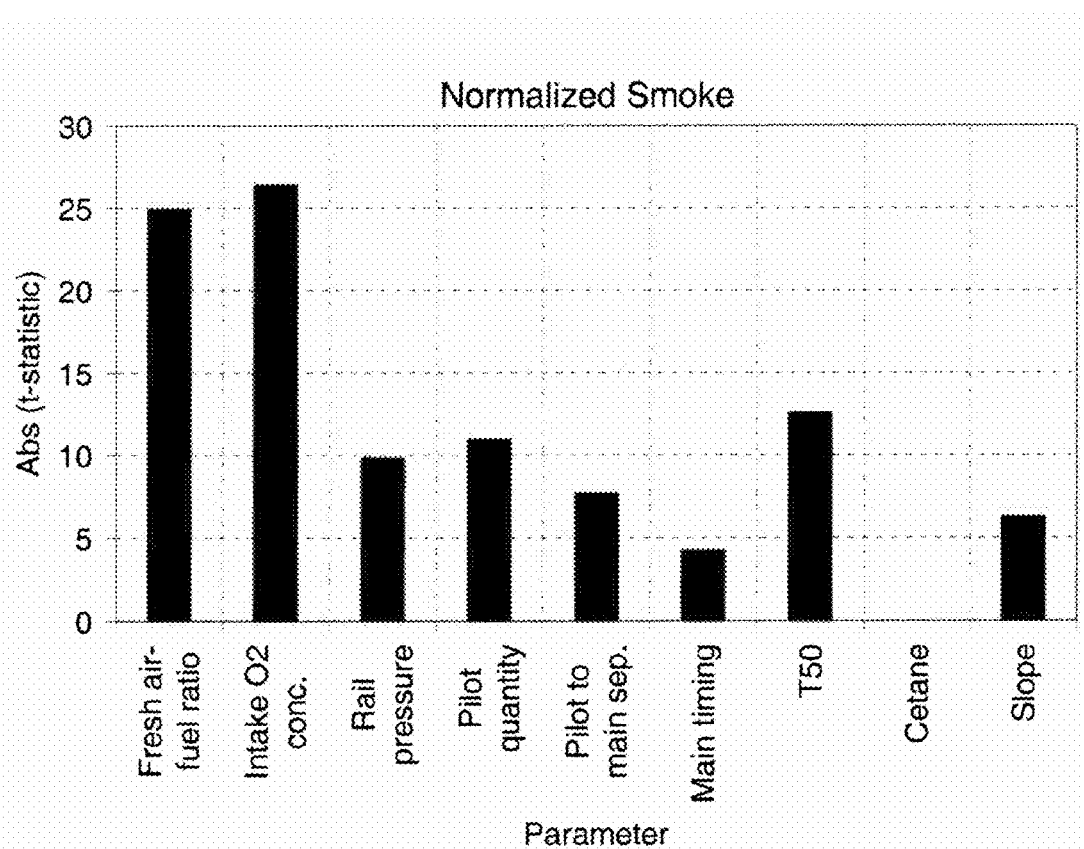
Figure 4:
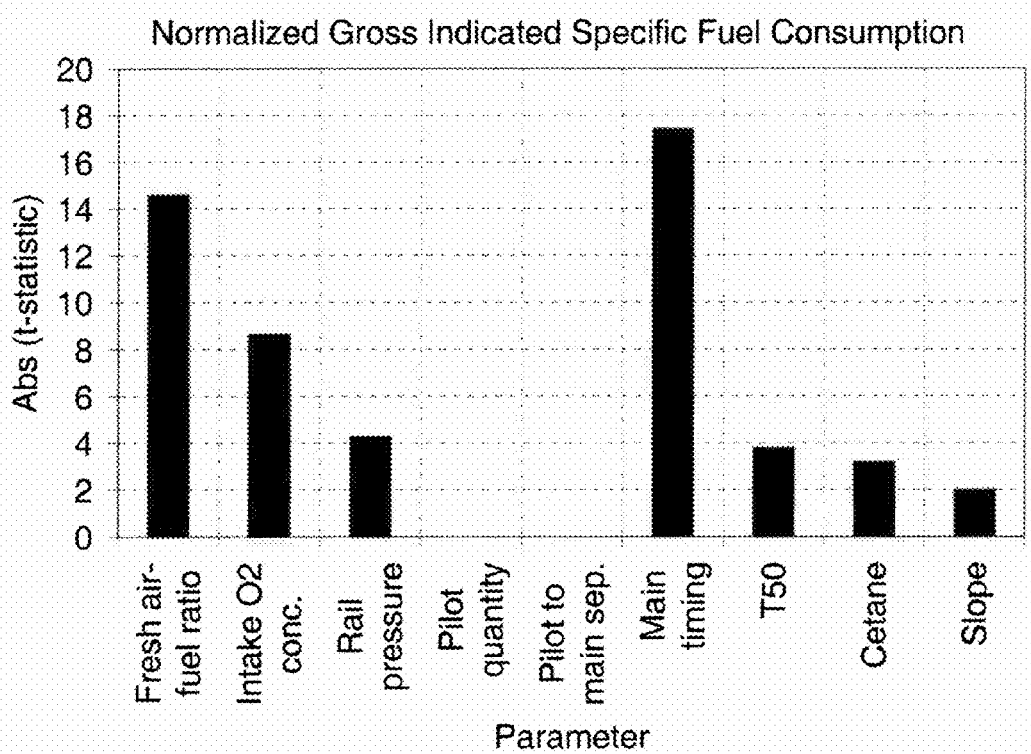

From experimental testing, fuel properties for function $f_2$ having the requisite minimum correlation and orthoganality were identified as cetane number, mid-distillation temperature (T50) and the distillation slope (defined as T90 minus T10, which respectively, stand for the 90% and 10% distillation temperatures). These properties represent the ignition quality, volatility and the rate of change of volatility, in that order. For the experimentation, the engine controls (in the function $f_1$) relevant to a diesel engine running an advanced combustion recipe and meeting beyond-2010 NOx, smoke, combustion noise and other targets were: fresh air-to-fuel ratio, EGR rate (represented by the intake O2 concentration), fuel rail pressure, pilot quantities and timing, and main injection timing. The fuel properties and engine controls were subjected to a parameter called a 't-statistic', defined as the ratio of the estimated model coefficient to the standard error. The larger the absolute t-statistic for the term, the more likely the term is significant. FIGS. 2-4 show the absolute t-statistic against their respective engine or fuel parameters for the models of NOx, smoke, and gisfc. The strongest dependency for the normalized NOx emission (FIG. 2) is with the intake O2 concentration: the higher the latter, the lower the diluent mass and hence greater the NOx. FIG. 2 captures the well established first-order relationships between engine-out NOx and other control parameters. The fresh air-fuel ratio, rail pressure, and the pilot quantity, as well as main injection timing all affect NOx to varying degrees. The fuel properties with the most influence on NOx are T50, and to a smaller extent, cetane number. A blank value against the distillation "slope" label indicates its relative insignificance in the NOx model in FIG. 2.

Figure 5:
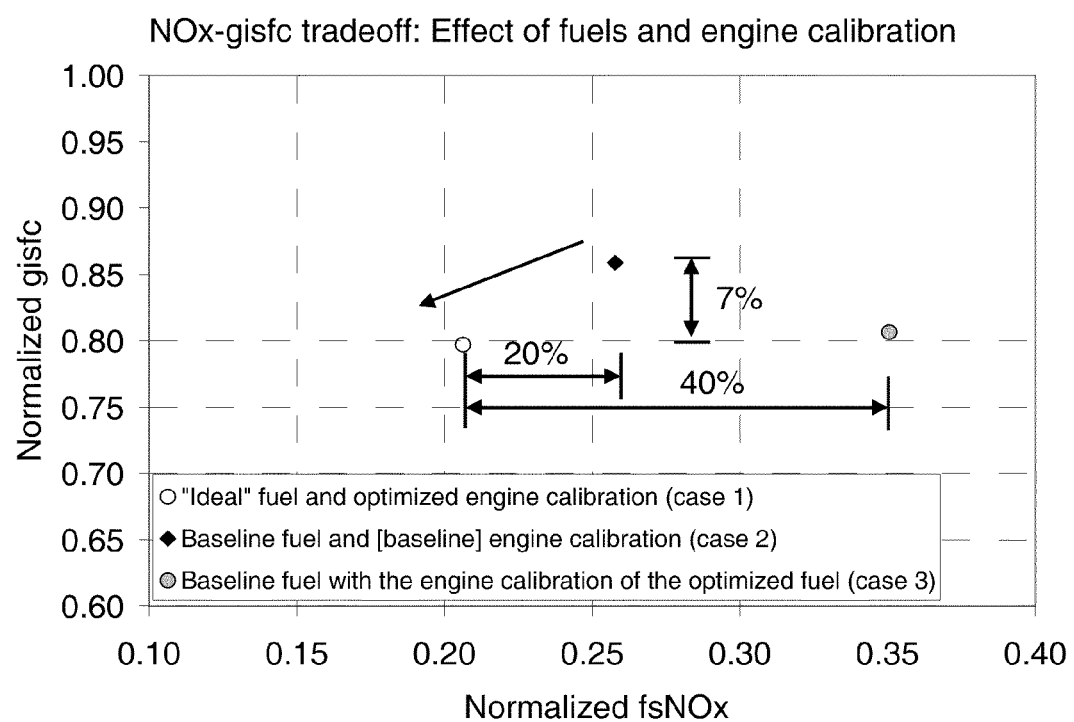
FIG. 5 is a graph illustrating experimental results for three specified cases.

FIG. 3 shows the first order "significant" terms for smoke: air-fuel ratio and intake O2 concentration, which both relate to smoke emissions primarily through their influence on the composition of the intake charge. Among the fuel properties, T50, and to a smaller degree, the slope, appear to be impacting smoke. FIG. 4 presents the direct influence of fuel properties on fuel consumption. Note that gisfc is dominated by the influence of engine control parameters over fuel effects. A more advanced main injection timing and higher air-fuel ratio drive improved fuel consumption accompanied with weaker effects for all three fuel properties: T50, cetane, and slope:

To assess the change in engine behavior with the use of the "ideal" fuel versus that of the baseline blend (the typical diesel #2 ULSD) and to differentiate the effect of fuel properties from engine calibration; a total of three case runs were conducted during the experimentation using the mathematical model. FIG. 5 plots the NOx-gisfc tradeoff (in normalized units) comparing three cases: (1) the lowest gisfc possible with the "ideal" fuel properties and optimal engine control settings, (2) the best gisfc at the lowest possible NOx fixing the fuel properties to that of the baseline, and (3) the NOx-gisfc combination obtained when the optimum engine calibration for the "ideal" fuel is applied to the baseline one.

Cases 1 and 2 associate the optimum engine performance and emissions achieved between the "ideal" and the baseline fuels and relative benefits realized using the former. Case 1 was conducted with constraints imposed on engine-out emissions such as NOx, smoke, UHC, combustion generated noise, as well as mechanical and structural responses (peak cylinder pressure and exhaust manifold temperature), while both fuel properties and engine controls lever settings were allowed to vary within the bounds of the experimental "design" space. The "optimal" engine settings for the two fuels though, are different. From FIG. 4, the baseline fuel could not be optimized at the same NOx level as that of the "ideal" one. The optimal fuel properties achieved in Case 1 represent a low T50, a high cetane number, and a moderate distillation slope. Fundamentally, these fuel property values suggest a general preference for a more volatile fuel with enhanced ignition quality and are consistent with the relationships captured in the individual models. The optimization to determine the best gisfc for the baseline fuel (case 2) was done by progressively relaxing the NOx constraint until a converged solution was achieved. The difference in NOx between the two fuels is around 20% as indicated in FIG. 5, and represents a significant departure in emissions behavior. The gisfc obtained with the baseline too, is nearly 7% higher than that of the "ideal" fuel. Note that the limits on smoke, UHC, combustion noise, and mechanical constraints were identical between cases 1-2.

TABLE 1

| | Optimized fuel and engine calibration (case 1) | Baseline fuel and optimized engine calibration (case 2) | Baseline fuel with engine control settings of case 1 (case 3) |
|---|---|---|---|
| DEPENDENT VARIABLES (Engine performance parameters) | | | |
| Normalized NOx | 0.206 | 0.257 | 0.351 |
| Normalized Smoke | 0.256 | 0.265 | 0.313 |
| Normalized gisfc | 0.795 | 0.856 | 0.807 |
| INDEPENDENT VARIABLES (Engine controls) | | | |
| Air-fuel ratio | 22.99 | 22.94 | 22.99 |
| Intake $O_2$ fraction | 0.135 | 0.137 | 0.135 |
| Rail pressure (bar) | 1864 | 1752 | 1864 |
| Main injection timing (deg. BTDC) | 5.68 | −1.26 | 5.68 |
| Pilot quantity (injector ontime in ms) | 0.15 | 0.15 | 0.15 |
| Pilot to main separation (ms) | 1.90 | 1.74 | 1.90 |
| INDEPENDENT VARIABLES (Fuel properties) | | | |
| T50 (deg. C.) | 193.30 | 255.00 | 255.00 |
| Cetane number | 56.90 | 44.80 | 44.80 |
| Distillation slope (deg. C.) | 100.74 | 102.80 | 102.80 |

Table 1 provides a detailed listing of the three different cases showing the engine responses along with the control settings and fuel properties. The engine control settings between cases 1 and 2 in Table 1 points to almost identical values for some variables such as air-fuel ratio, intake O2, pilot quantity and its separation from the main event, but significant deviations in others. Specifically, case 2 makes use of a retarded main injection timing and a slightly lower rail pressure. The difference in the main injection timing explains some of the gisfc deviation between the baseline and the "ideal" fuels.

To separate out the effect of fuel properties versus the impact of its engine control settings (main injection timing and rail pressure, primarily), case 3 was run by fixing the appropriate lever positions in the respective models for NOx, smoke, and gisfc to those of case 1 (or "ideal" fuel). The advanced timing and a marginal increase in rail pressure brings the fuel consumption within 1% close (see FIG. 5) to that of the "ideal" fuel, but causes a significant increase in the NOx emission (40%) and a slight rise in the smoke as listed in Table 1. These results indicate a significant enhancement in the NOx-gisfc tradeoff through the use of an "ideal" fuel blend. The NOx benefit in-turn, can be leveraged (with further optimization) to slightly increase the EGR rate and advance the main injection timing to enhance fuel efficiency.

At a "cruise" operating condition such as the one chosen here to run the engine experiments, these fuel consumption enhancements can be a substantial improvement to the fuel tank mileage.

The relationships characterized by expression (1) have a number of applications. For example, the regression model of expression (1) can be applied to determine calibration parameters for engine control. Calibration development of diesel engines typically involves the establishment of transfer functions of the form set forth in expression (2) as follows:

$$\text{Engine response[NOx,Smoke,gisfc,bsfc,etc]} = f_1(\text{engine control levers}), \quad (2)$$

in order to relate engine behavior to the "actuator" positions. Depending on the engine architecture, function $f_1$ consists of individual terms for: fresh air-to-fuel ratio (AF), EGR rate, rail pressure, engine speed, main injection timing and fueling, pilot and post quantities and timings, besides other parameters governing the engine pressure differential and flow rates through by-pass valves, as applicable. From expression (2), the expression for NOx can be explicitly written as $$[NOx]_{N\times 1} = \begin{pmatrix} a_{11} & \cdots & a_{1M} \\ \vdots & \ddots & \vdots \\ a_{N1} & \cdots & a_{NM} \end{pmatrix}_{N\times M} \cdot [x_1]_{M\times 1}, \quad (3)$$

where M depends on the number of engine actuators and their respective square and interaction terms as listed in the vector $$[x_1]_{M\times 1} = \begin{bmatrix} 1 \\ AF \\ EGR \\ Railp \\ \vdots \end{bmatrix}_{M\times 1},$$

$a_{11}$-$a_{NM}$ correspond to the fit coefficients and generally are computed using the traditional least-squares technique, and N relates to the size of the dataset used to build the model. Generally, N is a large number chosen to cover the entire operating map in order to develop high fidelity models of the form indicated in expression (3), and much larger than M. Similar to expression (3) the expressions for other engine responses such as smoke and bsfc are set forth in expressions (4) and (5), respectively:

$$[Smoke]_{N\times 1} = \begin{pmatrix} a_{11} & \cdots & a_{1M} \\ \vdots & \ddots & \vdots \\ a_{N1} & \cdots & a_{NM} \end{pmatrix}_{N\times M} \cdot [x_1]_{M\times 1}, \quad (4)$$

and $$[bsfc]_{N\times 1} = \begin{pmatrix} a_{11} & \cdots & a_{1M} \\ \vdots & \ddots & \vdots \\ a_{N1} & \cdots & a_{NM} \end{pmatrix}_{N\times M} \cdot [x_1]_{M\times 1} \quad (5)$$

These transfer functions are typically used to optimize for minimum fuel consumption subject to mechanical constraints and emissions targets to determine the optimal control lever settings or actuator positions. These optimal values represent the engine calibration and are specified in the Engine Control Unit (ECU) through models or look-up tables. In a conventional look-up table based calibration the area under the engine torque curve is discretized into small cells each representing a specific speed-load combination, with separate tables for the individual engine actuators as listed previously.

Following either experiments or simulations involving various fuel blends consistent with market-typical fuel property variation, calibrating the engine to accommodate fuel effects involves changes to expression (2). A set of terms representing fuel properties added to the right hand side of expression (2) results in expression (1) previously described. In one implementation based on the aforementioned experimentation, there are three selected fuel properties: cetane number, mid-distillation temperature (T50) and the distillation slope. These parameters can generally be easily ascertained through standard fuel property tests and can be incorporated into a real-time dynamic implementation to facilitate controls adaptations. Note that a different set of fuel properties may also be chosen for the model considering their impact on the engine behavior. In this context, expression (1) can be extended as set forth in expression (6) as follows:

$$[NOx]_{N\times 1} = \begin{pmatrix} a_{11} & \cdots & a_{1M} \\ \vdots & \ddots & \vdots \\ a_{N1} & \cdots & a_{NM} \end{pmatrix}_{N\times M} \cdot [x_1]_{M\times 1} + \quad (6)$$

$$\begin{pmatrix} b_{11} & \cdots & b_{1P} \\ \vdots & \ddots & \vdots \\ b_{N1} & \cdots & b_{NP} \end{pmatrix}_{N\times P} \cdot \begin{bmatrix} Fuelprop\ 1 \\ Fuelprop\ 2 \\ \vdots \\ Fuelprop\ P \end{bmatrix}_{P\times 1}$$

where $b_{11}$-$b_{NP}$ represent the fit coefficients corresponding to the fuel properties and P indicates the number of fuel properties used for the modeling. Expression (6) can be compactly written as expression (7):

$$[NOx]_{N\times 1} = \quad (7)$$

$$\begin{pmatrix} a_{11} & \cdots & a_{1M} & b_{11} & \cdots & b_{1P} \\ \vdots & \ddots & \vdots & & & \vdots \\ a_{N1} & \cdots & a_{NM} & b_{N1} & \cdots & b_{NP} \end{pmatrix}_{N\times (M+P)} \cdot \begin{bmatrix} [x_1]_{M\times 1} \\ [x_2]_{P\times 1} \end{bmatrix}_{(M+P)\times 1}$$

$$\text{where } [x_2]_{P\times 1} = \begin{bmatrix} Fuelprop\ 1 \\ Fuelprop\ 2 \\ \vdots \\ Fuelprop\ P \end{bmatrix}_{P\times 1}.$$

Expression (7) represents a combined model capturing the effect of engine control levers and fuel properties and can be subjected to the same optimization process to determine the optimal actuator positions. This computational approach enables the determination of a more ideal fuel, and can facilitate a "fuel-flexible" diesel engine when used with the appropriate control strategies that permit real-time dynamic estimation of the relevant fuel properties and on-board adjustments to deliver the best fuel efficiency. Given the generalities used in the present approach, it is expected to be applicable across a range of engine platforms and fuel types (including biodiesel).

Typically, calibration tables for engine control are generally static in nature, being initially loaded during manufacture and updated infrequently—typically during service, overhaul or upgrade (if ever). In addition to or in lieu of calibration applications, the model of expression (1) can be implemented to change engine performance during operation by accounting for fuel effects. In one implementation, a control strategy utilizes "favorable" diesel fuel to adjust engine behavior to achieve desired performance enhancements. Based on the experiments previously described in connection with FIG. 5 (and as further described in the subsequent experimental results section), a significant enhancement in NOx-gisfc tradeoff can be achieved. This type of enhancement can be implemented dynamically with the availability of appropriate inputs during engine operation and service.

Figure 6:
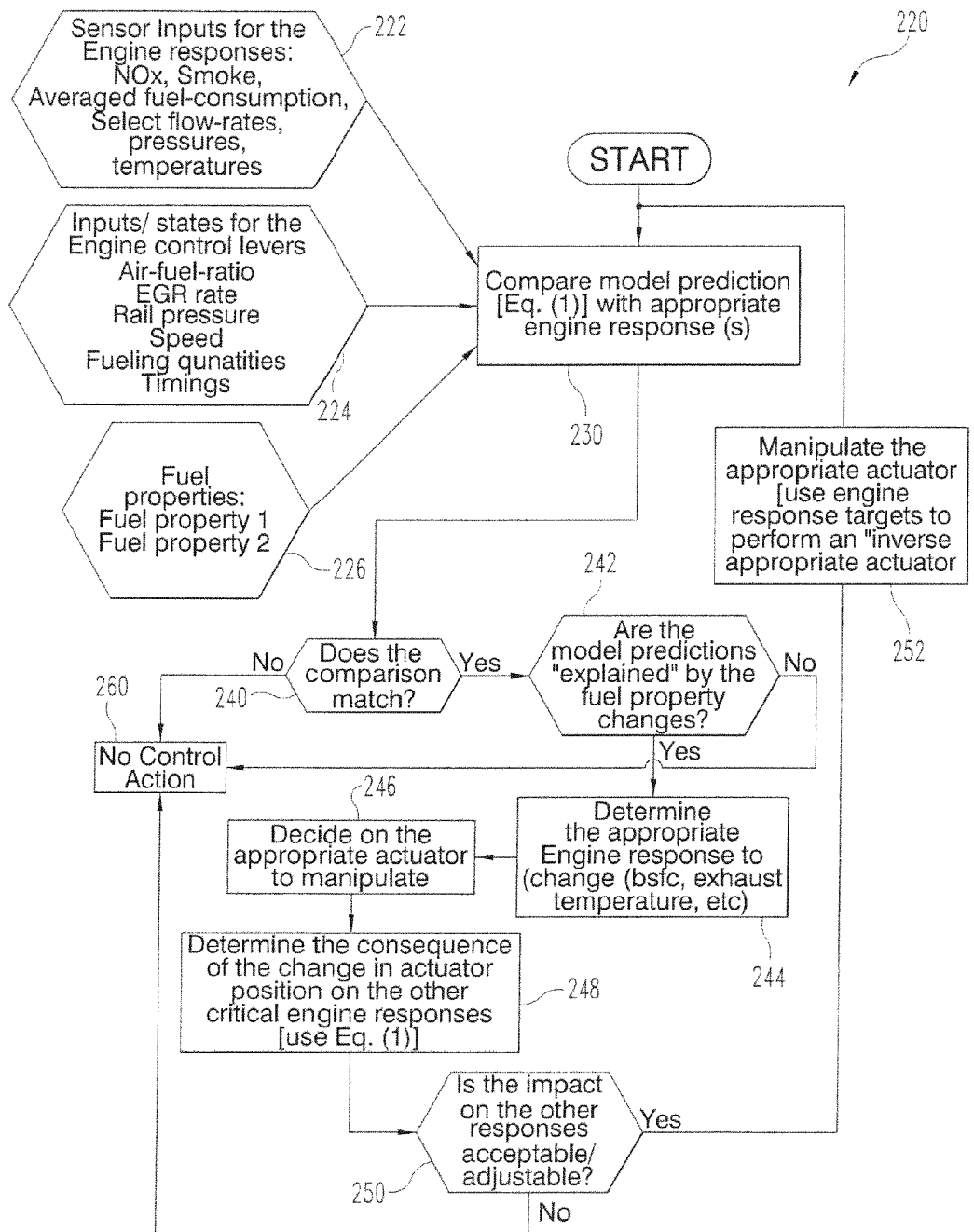
FIG. 6 is a flowchart of a procedure that may be performed with the system of FIG. 1.

A further dynamic engine control embodiment is described in connection with FIG. 6. FIG. 6 is a flowchart of fuel compensation procedure 220 that can be implemented with system 100, using appropriate controller operating logic. With either physical- or virtual-sensors to determine the fuel properties, and also the engine responses, the algorithm performs a comparison between the model prediction (from expression (1)) and the engine response variable. A close agreement between the two triggers further calculations to assess the relative contribution of the fuel properties in dictating the engine response. Once it is determined that the engine response is adequately attributed to the fuel properties, the relevant engine response, and hence its corresponding actuator is identified. A NOx benefit identified with a given fuel blend will either trigger a timing advance to improve fuel consumption, or reduce EGR rates to maintain cooler effectiveness. Likewise, a smoke benefit with a given "favorable" blend resulting in a slowing of the soot-loading rates will initiate suitable trims on the diesel particulate filter (DPF) control logic to reduce regeneration frequency, thereby improving fuel consumption. Prior to executing the actuation, checks are done to verify that the change does not result in undesirable or uncontrollable states for the engine response variables. The change done on the appropriate actuator is based on the "inverse" of the relationship referenced in expression (1).

More specifically, procedure 220 provides virtual or measured inputs 222 corresponding to various observed engine responses. Procedure 220 further includes engine performance characteristic inputs 224 and fuel property inputs 226. The inputs 222, 224, and 226 are provided to operation 230. Operation 230 applies expression (1) to solve for the model prediction of the engine responses and compares this model form to the observed engine responses. Conditional 240 tests whether the comparison matches within an established degree. Such a match indicates applicability of the model to the current engine operating state. The "yes" branch from conditional 240 proceeds to conditional 242 to further determine if model predictions correspond to fuel property changes. If the conditional 242 is true ("yes"), an appropriate engine response change is determined in operation 244 followed by identification of the appropriate engine actuator(s) to effectuate the change (such as injector timing/fuel quantity, EGR flow rate, fresh air intake, speed, injector rail pressure, and the like) in operation 246.

From operation 246, procedure 220 continues with operation 248. Operation 248 determines how the actuator change impacts other engine responses through application of expression (1). From operation 248, procedure 220 continues with conditional 250. Conditional 250 tests whether the impact on other engine responses, as determined in operation 248, is acceptable. If the test of conditional 250 is true ("yes"), the appropriate actuator(s) is(are) manipulated in operation 252 and procedure 220 returns to operation 230 to re-execute until the test of conditional 240 is false ("no"). If the test of conditional 240 is false ("no"), procedure 220 continues with operation 260 in which no control action is taken. Likewise, the false ("no") branches of conditionals 242 and 250 proceed to operation 260. Procedure 220 may be re-initiated from time-to-time as appropriate for the engine system. In one example, without limitation, procedure 220 is repeated each time fuel is added to a fuel reservoir for system 100.

EXPERIMENTAL RESULTS

The following experimental results are intended to be illustrative and not restrictive, providing nonlimiting examples of how the model of expression (1) can be applied to account for fuel effects in internal combustion engine-operation, among other things.

The diesel fuels evaluated were designed to include variations in three properties: cetane number, aromatic content, and distillation temperatures. A total of eleven different experimental fuels were derived from intermediate refinery blends streams and combinations of distillate products from four refineries. By choosing refinery-based fuels and typical blend stocks, the present study is constrained to include marketplace fuels rather than blends containing pure compounds or non-typical chemistries. Three levels of cetane number were achieved: 35, 45 and 55. The distillation characteristics targeted roughly three levels for T10 and two for T90, which respectively, represent the temperatures required to achieve 10% and 90% distillate levels. The total aromatic content was loosely controlled to be around 20% and 40%. The properties of the eleven blends are set forth in Table 2 as follows:

TABLE 2

| | T10 °C. | T50 °C. | T90 °C. | Cetane number | Cetane improver ppm | Mono-aromatics wt % | Poly-aromatics wt % | Total Aromatics wt % | Heating value KJ/kg |
|---|---|---|---|---|---|---|---|---|---|
| Test Method | D86 | D86 | D86 | D613 | | D5186 | D5186 | D5186 | D240 |
| Baseline | 202.2 | 255.0 | 305.0 | 44.8 | 0 | 23.28 | 9.41 | 32.69 | 45.6 |
| C | 225.6 | 268.9 | 323.3 | 35.8 | 0 | 19.69 | 33.51 | 53.2 | 44.3 |
| D | 183.9 | 215.6 | 257.8 | 46 | 0 | 16.92 | 0.98 | 17.9 | 46.0 |
| F | 210.6 | 253.9 | 315.0 | 56.9 | 200 | 18.58 | 3.88 | 22.46 | 45.9 |
| G | 170.6 | 193.3 | 250.0 | 31.5 | 0 | 43.98 | 2.31 | 46.29 | 45.0 |
| H | 262.2 | 288.3 | 326.1 | 44.4 | 0 | 18.44 | 24.11 | 42.55 | 44.7 |
| I | 178.3 | 245.6 | 312.2 | 46.9 | 0 | 16.36 | 7.42 | 23.78 | 46.0 |
| J | 221.1 | 265.0 | 318.3 | 44.6 | 0 | 22.9 | 15.53 | 38.43 | 45.0 |
| K | 191.7 | 221.7 | 249.4 | 42.2 | 0 | 20.76 | 1.27 | 22.03 | 45.8 |
| C+ | 224.4 | 268.3 | 323.9 | 44.5 | 5000 | 20.12 | 32.41 | 52.53 | 44.3 |
| D+ | 185.0 | 217.8 | 258.3 | 55.4 | 3200 | 16.95 | 0.74 | 17.69 | 46.1 |

The test fuels are labeled as baseline, C, D, F, G, H, I, J, K, C+, D+. The baseline fuel is a typical, market available, diesel #2 or ULSD blend. The two fuels with a "plus" symbol (C+ and D+) represent the ones which contain a cetane improver in significant quantities providing a 10 cetane number boost over their base blends (C and D). A cetane improver is an additive used to increase the cetane level without altering other fuel properties. Typical formulations of these additives include peroxides and nitrates. Ethyl hexyl nitrate was used as the improver in the fuels C+ and D+ for this study.

Figure 7:
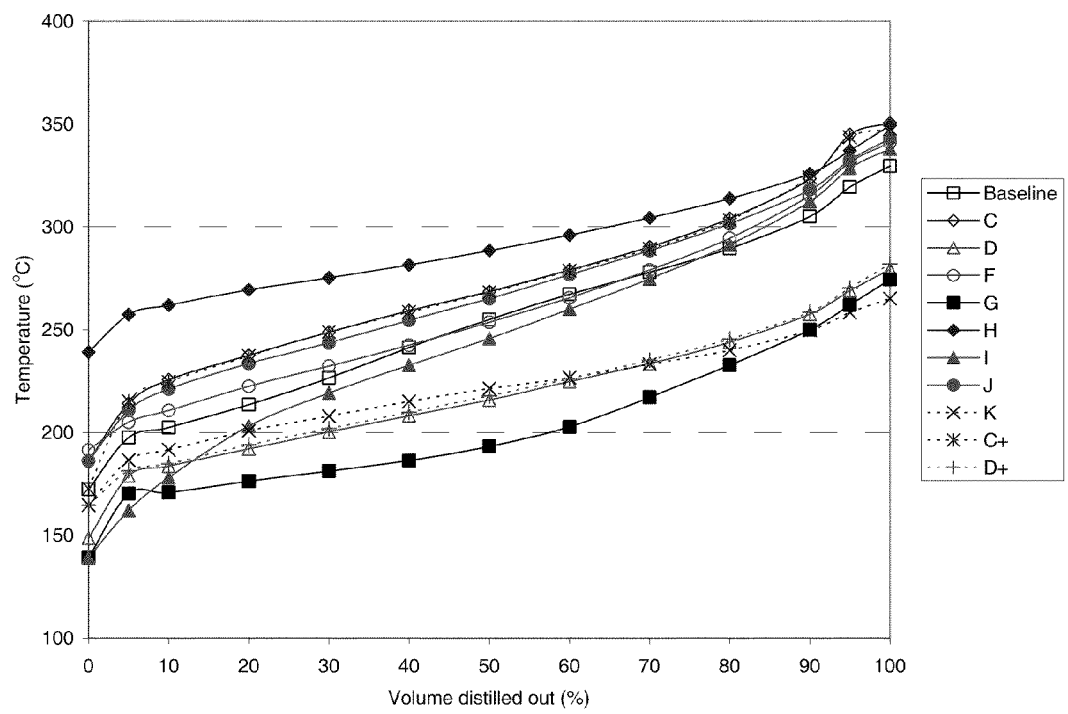
FIG. 7 is a chart of distillation curves for various test fuels.

FIG. 7 plots the distillation curves for the various fuels. The baseline fuel has the distillation of a typical #2 fuel, while fuels D and K are the regular diesel #1. The fuel H has a much higher T10 compared to the others, whereas fuel G with a low T10 is lighter than the typical kerosene. From the distillation plot in FIG. 7, in the region spanning the 10-90% distillate levels the curves appear rather linear. In this study, the slope between T10 and T90, and T50 are adopted to indicate fuel volatility.

In order to relate fuel properties and engine controls to the engine responses, regression models corresponding to expression (1) were developed for relevant performance and emissions parameters following experiments varying engine control settings and fuel properties. These parameters included fuel specific NOx (fsNOx), smoke, gross indicated fuel consumption (gisfc), peak cylinder pressure (pcp), exhaust manifold temperature, crank angle for 50% cumulative heat release (CA50) and others. It should be appreciated that gross quantities are used here over brake-specific ones because of the use of a single cylinder engine for the experiments.

In modeling the engine behavior through the form indicated in expression (1), the correlation of the regression terms contained in functions $f_1$ and $f_2$ was examined. As previously described, correlation, aliasing, or co-linearity indicates a linear relationship between two variables under consideration. Because some fuel properties are correlated owing to the coupled relationships between physical features like cetane number and distillation characteristics with chemical attributes such as aromatics content. Hence, it is not only challenging to blend test fuels to achieve a full factorial design, but also to identify a suitably orthogonal set of independent fuel properties to analyze fuel impact on engine behavior.

Table 3 shows correlations between select fuel properties: distillation characteristics (T10, T50, T90, and slope), cetane number, mono-, poly-, total aromatic content, density and heating value.

The density and heating values are included here to track the impact of fuel chemistry on physical fuel characteristics. The numbers in the table represent the R-value, which is a quantitative measure of the degree of linear relationship between two variables, with fractions approaching +1 or −1 signifying a strong linear relationship. The variable-pairs which have absolute R-values ≥0.6 are highlighted in the table. Note that the three distillation temperatures (T10-90) are all correlated to one another and with the poly-aromatic content. The cetane number is correlated with the mono- and the total aromatic content. Again, the poly-aromatic content is heavily confounded with the fuel density and heating value indicating that heavy fuels tend to have a greater fraction of poly-aromatic stocks and a lower heating value as indicated previously.

Examining the properties with the least aliasing and limiting to only the physical fuel properties, the cetane, T50 and the slope do not show any significant correlation and qualify as terms in the function $f_2$ in expression (1). Therefore, the regression model is expected to reveal the relative significance of volatility, ignition quality and the distillation temperature change on engine performance and emissions. While this approach is expected to uncover the relative sensitivity of the engine response to the various physical fuel descriptors, the property correlations limit the possibility of decoupling the impact of fuel chemistry in dictating the pathways governing engine combustion and emissions.

Figure 8:
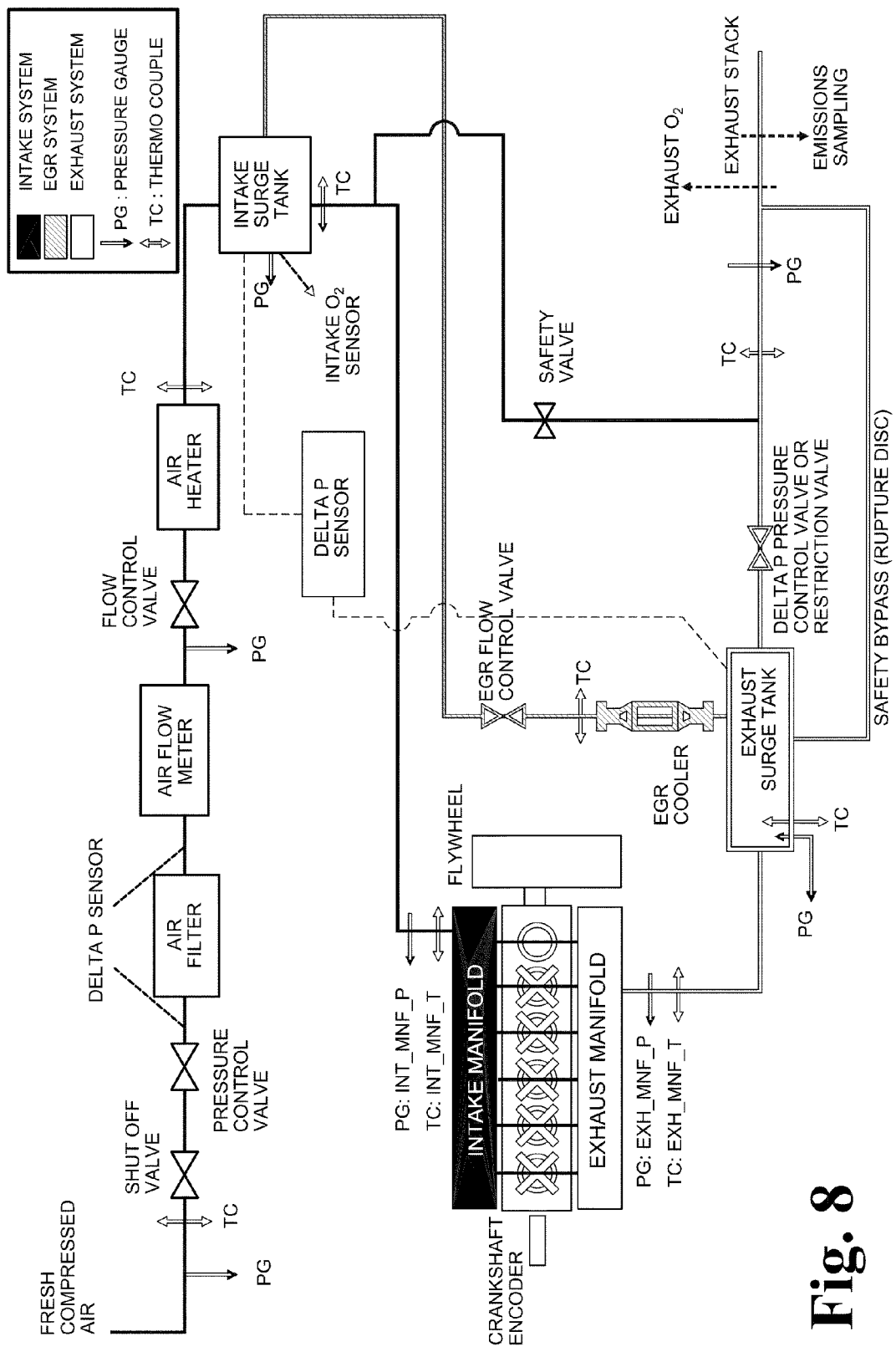
FIG. 8 is a schematic view of a single cylinder engine setup for experimentation.

The experiments for each fuel were conducted on a Cummins 6.7 L ISB (I-6) engine modified for single cylinder operation and used extensively for advanced combustion studies owing to the ability to achieve precise control and measurement of the test parameters. FIG. 8 shows a simplified schematic of the single cylinder test facility and Table 4 provides the details of the ISB engine.

TABLE 4

| | |
|---|---|
| Bore | 107 mm |
| Stroke | 124 mm |
| Displacement | 1.1 L/cyl |
| Compression ratio | 17.1 |
| Swirl | 2.5 DCS |
| Fuel system | Bosch CRIN3.0 high pressure common rail |
| Injector specifications | 8 holes, 146 included angle, 550 cc/30 sec (at 100 bar) nozzle flow rate |

TABLE 3

| | T10 | T50 | T90 | Slope | Cetane | Mono-aromatic content | Poly-aromatic content | Total Aromatic content | Density |
|---|---|---|---|---|---|---|---|---|---|
| T50 | 0.90 | | | | | | | | |
| T90 | 0.74 | 0.94 | | | | | | | |
| Slope | −0.12 | 0.30 | 0.58 | | | | | | |
| Cetane | 0.02 | 0.14 | 0.12 | 0.15 | | | | | |
| Mono-aromatic content | −0.32 | −0.48 | −0.36 | −0.15 | −0.67 | | | | |
| Poly-aromatic content | 0.77 | 0.78 | 0.76 | 0.19 | −0.32 | −0.17 | | | |
| Total Aromatic content | 0.53 | 0.45 | 0.49 | 0.09 | −0.67 | 0.41 | 0.83 | | |
| Density | 0.80 | 0.74 | 0.69 | 0.03 | −0.41 | 0.00 | 0.97 | 0.90 | |
| Heating value | −0.67 | −0.56 | −0.54 | 0.02 | 0.59 | −0.25 | −0.90 | −0.97 | −0.96 |

The cylinder block used here is that of a multi-cylinder engine, but only one of the cylinders undergoes combustion. The engine was run on an AVL dynamometer. The composition, temperature, humidity and mass flow rate of the fresh air is carefully controlled. The intake fresh air is conditioned and its flow regulated through high-precision control valves prior to being mixed with the cooled EGR stream. An electronically controlled high pressure Bosch common rail system provides the fuel injection. Almost independent control of EGR mass flow rate, pressure difference across the engine and the fresh airflow is accomplished by the use of two surge tanks—one each for the intake and the exhaust side. The intake manifold temperature is controlled with electric heating elements located upstream of the intake surge tank. The rate of EGR is measured real time with a wide-band oxygen sensor (made by ECM) installed near the engine intake manifold, and controlled by actuating the EGR flow control valve. The coolant and lubricating systems are external to the engine and maintain temperatures, pressures and flow rates consistent with realistic multi-cylinder engine operation. Each fuel was thoroughly stirred prior to the commencement of the test and pumped into the engine fuel tank from a barrel through an external lift pump. The engine system was also completely purged before the start of a new fuel test.

The single cylinder test facility is instrumented to enable precise control and monitoring of selected parameters. The fresh air mass flow rate is measured with a MicroMotion ELITE model coriolis flow meter. Fuel flow rate is calculated using a load-cell based balance system. The in-cylinder combustion processes are studied through the use of a high-precision KISTLER water-cooled pressure transducer and recorded and analyzed using a data acquisition system. Gaseous emissions are measured on both the intake and exhaust side using a multi-function bench made by California Analytical Instruments. Measurements for the exhaust-side NOx, CO, $O_2$, and unburnt hydrocarbon (UHC) species are made using appropriate analyzers, and an AVL415 is used to record smoke data. Carbon-dioxide ($CO_2$) was logged on both the intake and exhaust gas streams of the engine through the non-dispersive infrared (NDIR) analyzers.

Figure 9:
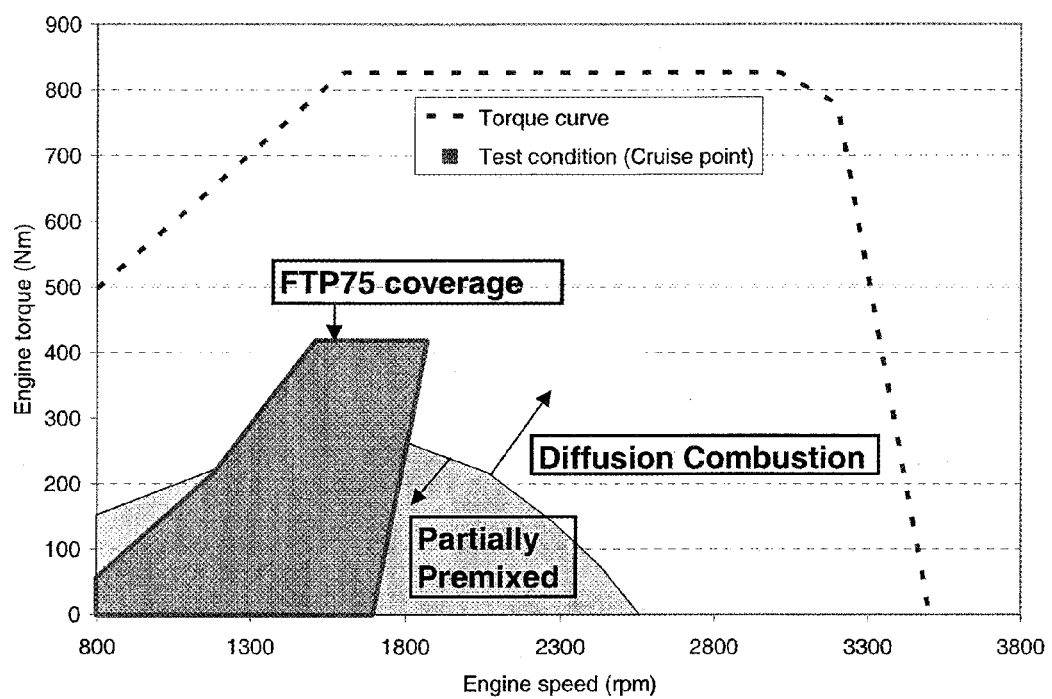
FIG. 9 is a plot depicting the torque curve of a 6.7 L engine and the test condition used for the experiments.
Figure 10:
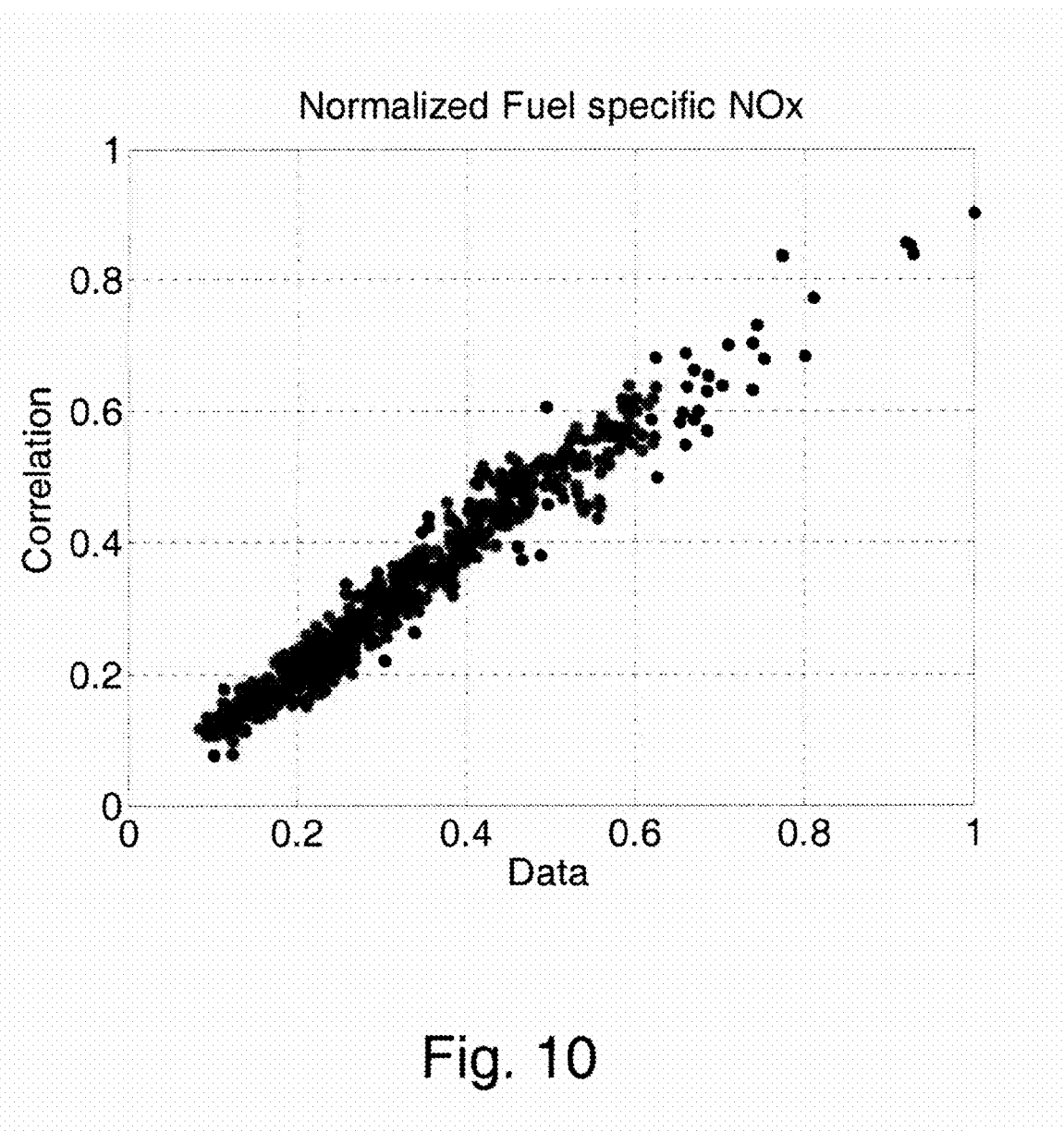
FIGS. 10-14 are plots of correlation versus experimental data for fsNOx, smoke, gisfc, pcp, and CA50, respectively.
Figure 11:
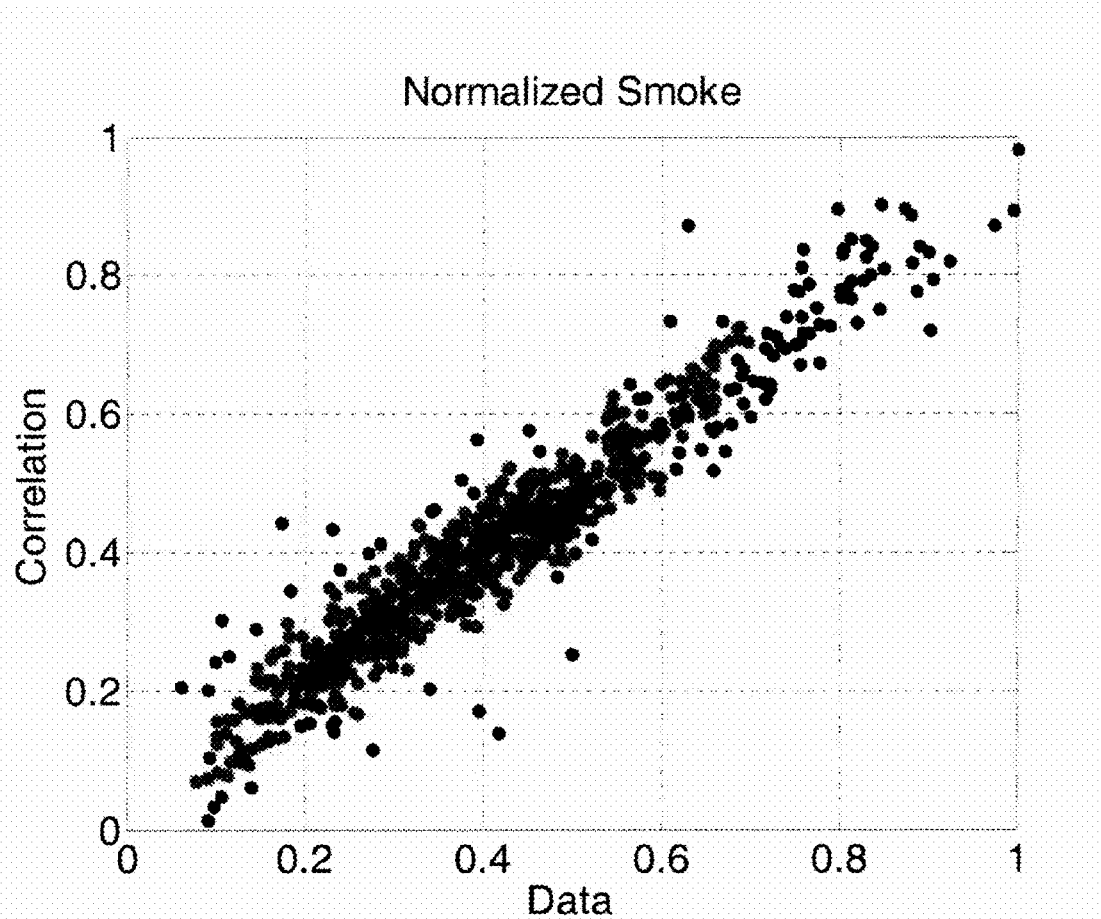
Figure 12:
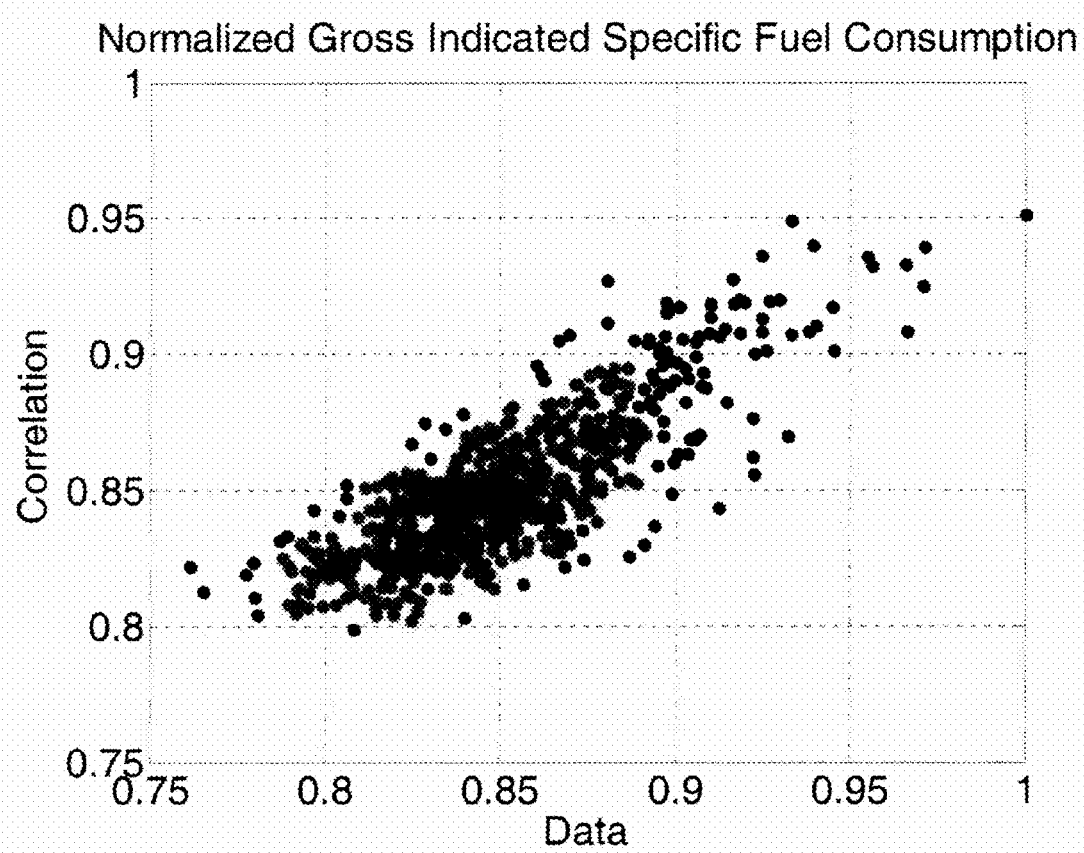
Figure 13:
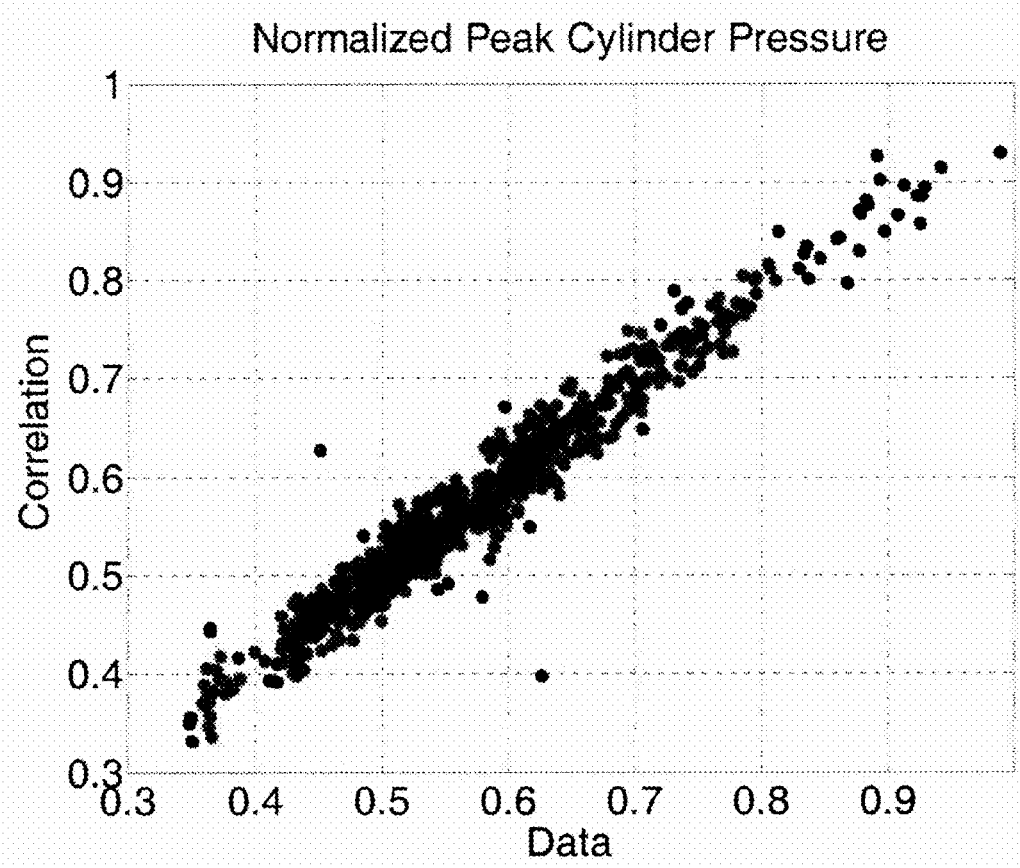
Figure 14:
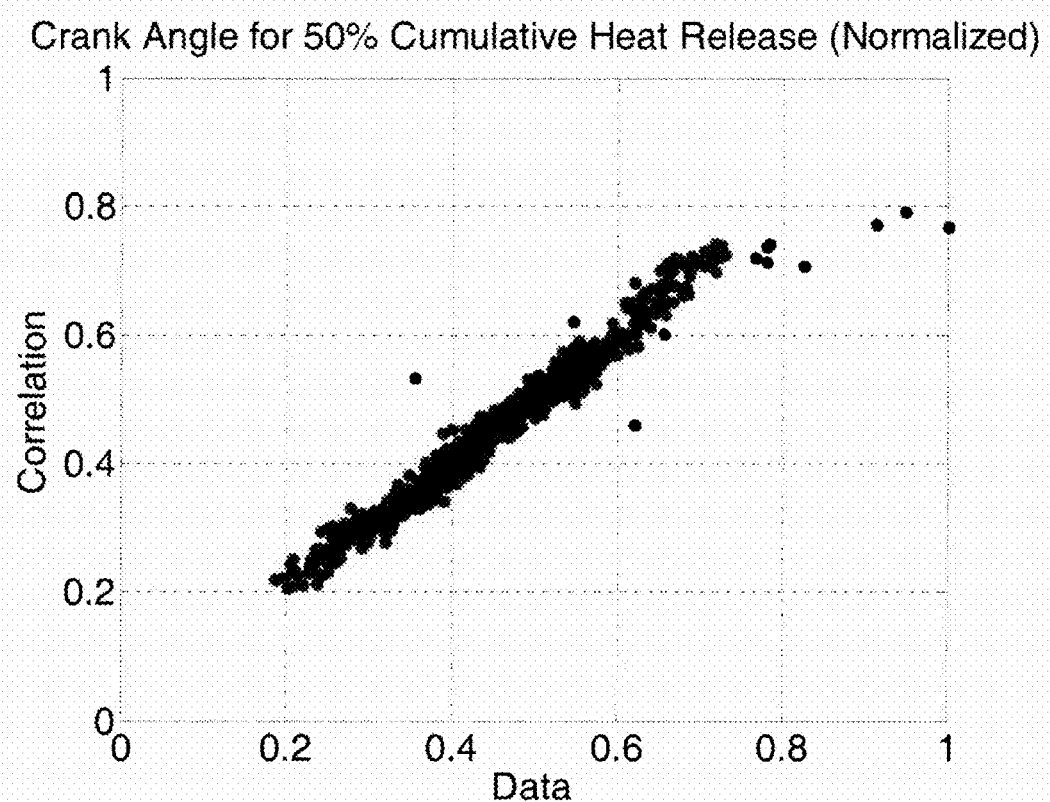

The torque curve of the test engine and the speed-load combination where the experiments were conducted are plotted in FIG. 9. The test condition (1700 rpm, 372 Nm) selected for evaluating the eleven different fuels represents a mid-load, emissions-critical operating point in the transient chassis certification test cycle (FTP75) and lies close to the boundary of the partially premixed (or PCCI) combustion regime of the engine. It simulates the highway "cruise" operation of a typical pickup truck. Designed statistical experiments were carried out for each of the considered fuels. Several engine control parameters were manipulated for every fuel test: the air-handling system variables included the fresh air-fuel (AF) ratio and the EGR fraction, whereas the fuel system levers involved the start of the main injection event, the rail pressure, the pilot injection quantity and the separation between the pilot and the main events. The engine was run on a constant-speed mode and the fueling quantities were held constant by manually adjusting the injector opening durations (also referred to as ontimes). The post fueling ontime and the duration between the start of the main—and the post—was kept constant in this study. The total charge flow and the intake manifold pressure were allowed to float.

The engine experiments involved perturbations of the control parameters to achieve an ultra-low NOx combustion process. High EGR rates, elevated rail pressures, and main injection timings centered on top dead center (TDC), were employed along with pilot and posts event to meet the targeted NOx, smoke and noise emissions. A two-level, full-factorial, central composite approach was selected for the design of the statistical experiment and the corresponding test plan was executed for each fuel using the statistics package MINITAB. Each fuel test involved 90 points representing different levels and combinations of the independent engine control parameters.

The results from the engine experiments are presented in five parts. The relationships between fuel properties and the engine responses as determined from the models are described first followed by an outline of the optimization process to determine the "ideal" fuel properties (and engine controls) for best fuel consumption. Comparisons are made between the performance and emissions achieved between the "ideal" and the baseline ULSD fuels. Next, fuel property trends are examined through contour plots of select engine responses supplemented by heat release traces from chosen test points to explain fuel effects. Complementary results obtained for the same engine as the one used here are presented to further explain the effect of a cetane number change across the engine operating map. A short outline on the refining impact of this "ideal" fuel will also be provided. Next, the effect of large cetane improver volumes on NOx emissions are explained by comparing results from two different fuel experiments. Finally, the simulated fluctuations in emissions and fuel consumption caused by variations in-market diesel fuel properties are clarified using histograms developed from the statistical models.

The engine calibrations and hence the limits used for the various independent variables chosen for the experiments had to be slightly adjusted for some fuels according to their properties in order to achieve NOx and smoke emissions comparable to that of the baseline fuel. In general, six fuels in the mid-to-high cetane range (45-55 approximately) corresponding to the baseline, D, D+, F, I, H tended to run with the same engine control parameter ranges (with respect to air-fuel ratio, EGR rates, pilot quantities, and others). The low cetane number fuels (C and C+) and the ones with low distillation temperatures and flat boiling curves (K and G) needed marginally advanced main injection timings.

The models for the various engine responses in expression (1) were formulated such that first function $f_1$ is quadratic in the engine control parameters. In order to avoid over-fitting and oscillatory responses with the use of higher order terms for $f_2$, a first-order form was used for fuel properties that were least aliased or correlated as determined previously. Also, to prevent the possible influence of the cetane improver on the functional relationship between fuel properties and NOx, and considering that commercial fuels seldom have such large quantities of the additive, the two cetane improved fuels (C+ and D+) were removed from the regression model and examined separately as described in the subsequent sections. The least-squares method was used to fit the models of the form indicated in expression (1). The models for selected engine parameters, namely fsNOx, smoke, gisfc, pcp, and CA50 are presented in their normalized forms through FIGS. 10-14. The normalization has been done as a fraction of highest value encountered in the experimental range. Good model correlations were achieved for NOx, smoke, pcp, and CA50 (with R-square values of 0.955, 0.908, 0.949, 0.962 respectively) whereas the fit for gisfc (R-square=0.650) shows some deviation from the measurements, owing partly to the higher dispersion in the data, and also due to a smaller range of variation in that parameter compared to NOx and smoke. The gisfc predictions are still expected to be accurate in view of their percentage standard deviations (taken as the ratio of the standard deviation between correlation and experimental data divided by the mean of the test data) being close to repeatability of the measurement, which was determined to be around 2%.

In order to identify the parameters exerting the most influence on the engine responses, each model was examined and filtered to include only those terms with a p-value less than 0.05, indicating a 95% confidence on their statistical significance. Further, to isolate the first order terms with the largest effect on NOx, smoke, gisfc, pcp, and CA50, the t-statistic was utilized as previously introduced in connection with FIGS. 2-4 for NOx, smoke and gisfc, respectively. The t-statistic for pcp and CA50 are provided in FIGS. 15 and 16, respectively. Recall, the larger the absolute t-statistic for the term, the more likely the term is significant. Because EGR control for the engine experiments was achieved through the use of a wide-band intake oxygen sensor, the regression model here uses the intake oxygen concentration as a surrogate for EGR.

Figure 15:
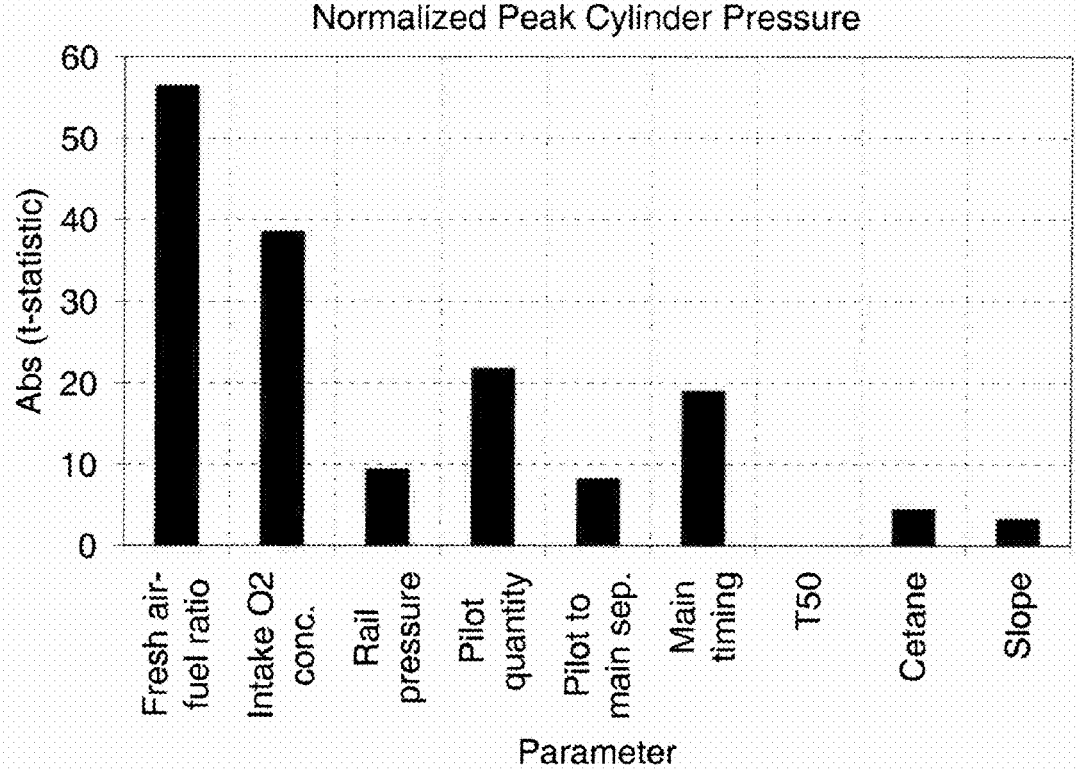
FIGS. 15-16 are graphs depicting the absolute t-statistic against their respective engine or fuel parameters for models of pcp and CA50, respectively.
Figure 16:
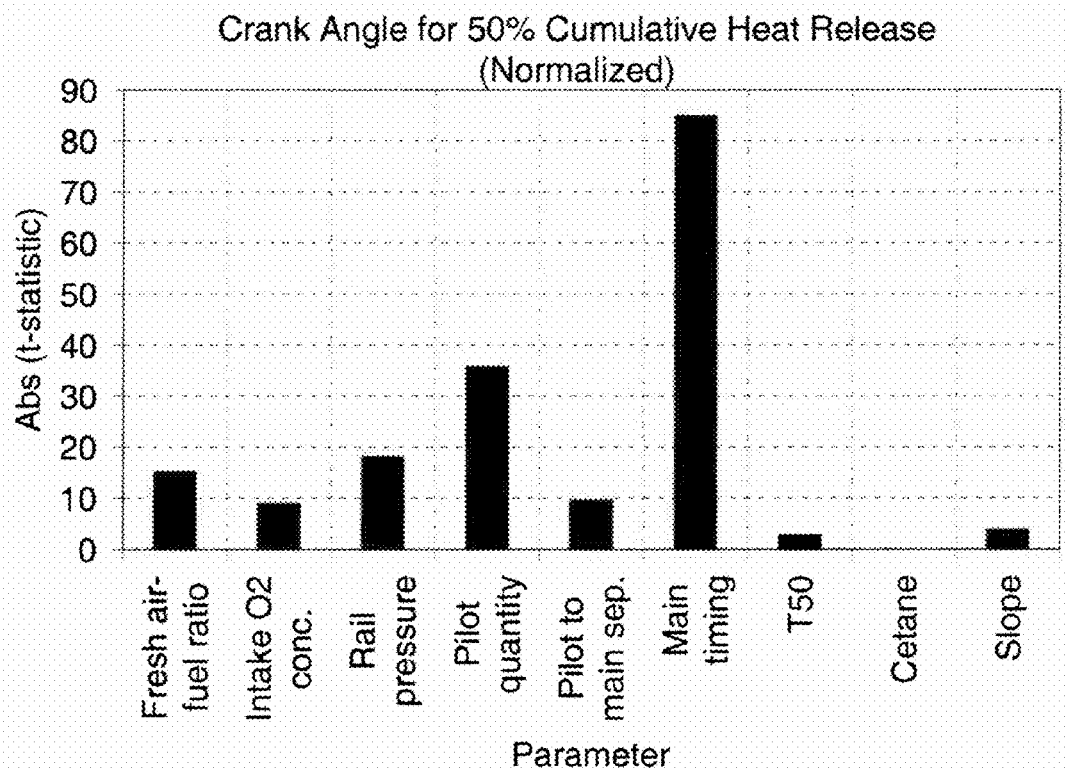
Figure 17:
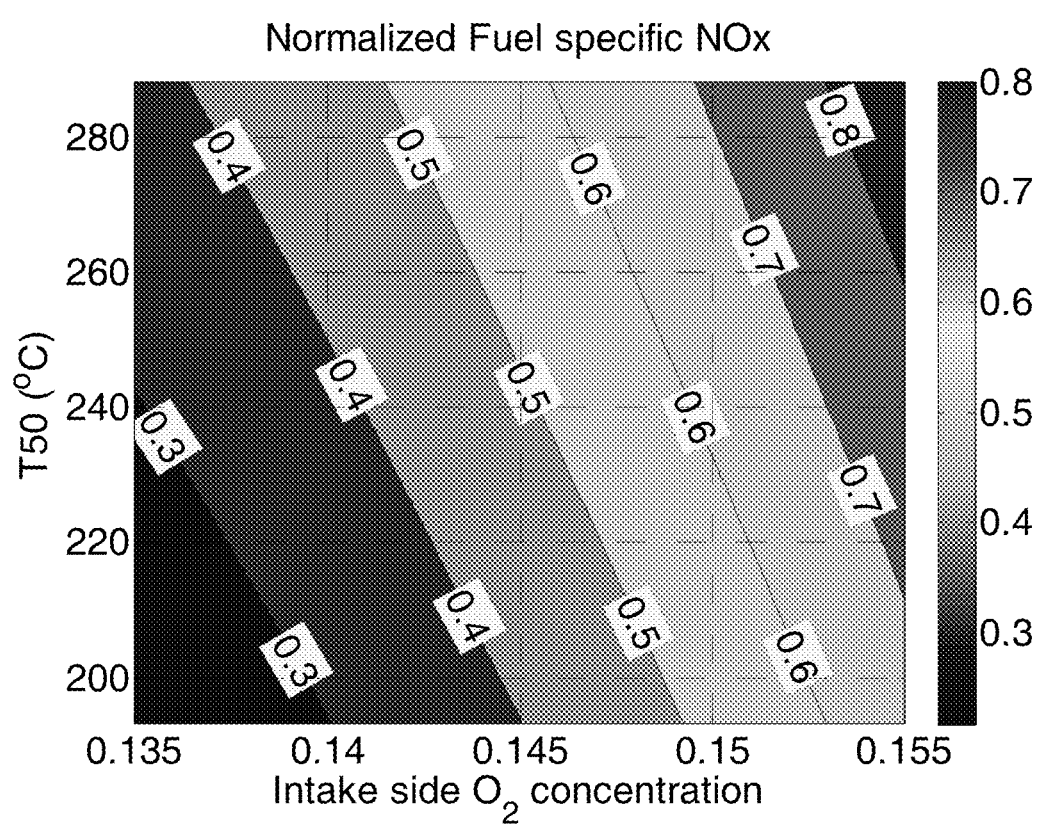
FIGS. 17-21 provide contour plots for the normalized forms of NOx, smoke and gisfc as a function of select variables or first-order model terms identified to have the strongest effect on each of them as identified in FIGS. 2-4, respectively.

As expected, the strongest dependency for the normalized NOx emission (FIG. 2) is with the intake $O_2$ concentration: the higher the latter, the lower the diluent mass and hence the greater the NOx. The model captures the well established first-order relationships between engine-out NOx and other control parameters. The fresh air-fuel ratio, rail pressure, and the pilot quantity, as well as main injection timing all affect NOx to varying degrees. The fuel properties with the most influence on NOx are T50 and to a smaller extent, cetane number. A blank value against the "slope" label indicates its relative insignificance in the NOx model. It should be appreciated that second order (square and interaction) terms can impact the sensitivity of several of these parameters to the model output—contour plots for key fuel and engine parameters are presented hereinafter. FIG. 3 shows the first order "significant" terms for smoke: air-fuel ratio and intake $O_2$ concentration relate to smoke emissions primarily through their influence on the composition of the intake charge. Among the fuel properties, T50, and to a smaller degree, the slope, appear to be impacting smoke. FIG. 4 presents the direct influence of fuel properties on fuel consumption. It should be appreciated that gisfc is dominated by the influence of engine control parameters over fuel effects. A more advanced main injection timing and higher air-fuel ratio drive improved fuel consumption accompanied with weaker effects for all three fuel properties: T50, cetane and slope. The two combustion characterization parameters, pcp and CA50, both appear to be relatively immune to fluctuations in fuel properties (FIGS. 15-16). Engine controls that effect intake manifold pressure (EGR rate and airflow) dominate the pcp results whereas main injection timing dictates the phasing of the heat release (CA50).

Using the mathematical models developed previously, the improvement in fuel consumption afforded by the optimum combination of engine controls and the "ideal" fuel properties were studied by defining and solving a "minimization" problem. Because the fuel properties selected for the modeling are not correlated, the combination of T50, cetane number and distillation slope that would provide the best fuel consumption would accurately capture, for the range and type of fuels evaluated, the physical fuel attributes required for optimal combustion and emissions. The optimization of gisfc was conducted with constraints imposed on engine-out emissions such as NOx, smoke, UHC, combustion generated noise, as well as mechanical and structural responses (peak cylinder pressure, and exhaust manifold temperature). Table 5 provides a listing of these constraints against the dependent variables under consideration.

TABLE 5

| DEPENDENT VARIABLES | Constraint (normalized) |
| --- | --- |
| gisfc | Minimize |
| NOx | <0.206 |
| Smoke | <0.266 |
| UHC | <1 |
| Combustion Noise | <0.895 |
| PCP | <0.894 |
| Exhaust temperature | <1 |

The NOx, smoke and UHC constraints were chosen based on legislated emission limits for the FTP75 test, and the combustion noise level were fixed depending on cylinder structural requirements, vehicle drivability, and OEM cabin-noise thresholds. Because all fuels exhibited diffusion flame dominated combustion (select heat release traces will be presented later) at this operating condition, the engine data indicated that carbon monoxide (CO) levels were generally well within the design targets. Suitable ranges were also specified for the independent parameters manipulated as part of the statistical experiments (both engine variables and fuel properties) consistent with the values used for the engine experiments and limited by control states achievable with multi-cylinder engine operation. Table 6 provides a listing of the ranges prescribed for the independent variables considered for the optimization. These ranges would dictate the multi-dimensional "space" allowed for the optimizer algorithm to determine a feasible solution.

TABLE 6

| | Range |
| --- | --- |
| INDEPENDENT VARIABLES (Engine controls) | |
| Air-fuel ratio | 18-23 |
| Intake $O_2$ fraction | 0.135-0.155 |
| Rail pressure (bar) | 1600-1900 |
| Main injection timing (deg. BTDC) | −2 to 6 |
| Pilot quantity (injector ontime in ms) | 0.15-0.4 |
| Pilot to main separation (ms) | 1-2.25 |
| INDEPENDENT VARIABLES (Fuel properties) | |
| T50 (deg. C.) | 193.3-268.9 |
| Cetane number | 31.8-56.9 |
| Distillation slope (deg. C.) | 57.8-133.9 |

The optimization was performed using a gradient-based algorithm for non-linear multivariable responses by invoking the standard function 'fmincon' available in the commercial package MATLAB. This function uses initial starting values for the various independent variables to converge on an optimal solution through numerical iterations. Around 100 random starting points were assigned to the optimizer for multiple runs to ensure that complete design space for the independent variables was swept, and also to determine a "global" optimum instead of the "local" one. Complex response surfaces involving multiple dimensions for the independent variables; and containing linear, square, and cross-product terms sometimes produce local inflection points which may not represent the true optimum of the function.

Table 7 provides the results for the optimization conducted to determine the lowest gisfc, presenting the optimal engine control settings and the "ideal" fuel properties.

TABLE 7

| | Value |
|---|---|
| INDEPENDENT VARIABLES (Engine controls) | |
| Air-fuel ratio | 22.99 |
| Intake $O_2$ fraction | 0.135 |
| Rail pressure (bar) | 1864 |
| Main injection timing (deg. BTDC) | 5.68 |
| Pilot quantity (injector ontime in ms) | 0.15 |
| Pilot to main separation (ms) | 1.90 |
| INDEPENDENT VARIABLES (Fuel properties) | |
| T50 (deg. C.) | 193.30 |
| Cetane number | 56.90 |
| Distillation slope (deg. C.) | 100.74 |

The resultant solution satisfied all the prescribed emissions and mechanical constraints listed in Table 5. The optimal engine calibration calls for a high air-fuel ratio, low intake $O_2$ concentration, high rail pressure, advanced main injection timing, small pilot quantity and a moderate separation between the pilot and the main events. Clearly, a low intake $O_2$ concentration is a key enabler for NOx reduction. Higher air-fuel ratios and elevated rail pressures relate to smoke mitigation—the latter typically providing for greater spray penetration, smaller droplet diameters, and faster vaporization. Small pilot quantities aid reductions in combustion noise through early charge-stratification whereas advanced injection timings enhance fuel consumption. The optimal fuel properties represent a low T50, a high cetane number and a moderate distillation slope. Fundamentally, these fuel property values suggest a general preference for a more volatile fuel with enhanced ignition quality and are consistent with the relationships captured in the individual models.

To access the change in engine behavior with the use of the "ideal" fuel versus that of the baseline blend, and to differentiate the effect of fuel properties from engine calibration, two more comparative case runs were conducted. As previously described, FIG. 5 plots the NOx-gisfc tradeoff (in normalized units) comparing three cases: (1) the lowest gisfc possible with the "ideal" fuel properties and optimal engine control settings, (2) the best gisfc at the lowest possible NOx fixing the fuel properties to that of the baseline, and (3) the NOx-gisfc combination obtained when the optimum engine calibration for the "ideal" fuel is applied to the baseline one. Table 1 provides a detailed listing of the three different cases showing the engine responses along with the control settings and fuel properties. The information from Table 1 (representing case 1) is repeated here and compared to that of cases 2-3. A more detailed description of the three cases follows.

Cases 1 and 2 associate the optimum engine performance and emissions achieved between the "ideal" and the baseline fuels and relative benefits realized using the former. The "optimal" engine settings for the two fuels though, are different. From FIG. 5, the baseline fuel could not be optimized at the same NOx level as that of the "ideal" one. The optimization to determine the best gisfc for the baseline fuel (case 2) was done by progressively relaxing the NOx constraint until a converged solution was achieved. The difference in NOx between the two fuels is around 20% as indicated in the figure, and represents a significant departure in emissions behavior. The gisfc obtained with the baseline too, is nearly 7% higher than that of the "ideal" fuel. It should be appreciated that the limits on smoke, UHC, combustion noise and mechanical constraints were identical between cases 1-2. The engine control settings between the two cases in Table 7 points to almost identical values for some variables such as air-fuel ratio, intake $O_2$, pilot quantity and its separation from the main event, but significant deviations in others. Specifically, case 2 makes use of a retarded main injection timing and a slightly lower rail pressure. The difference in the main injection timing explains some of the gisfc deviation between the baseline and the "ideal" fuels. To separate out the effect of fuel properties versus the impact of its engine control settings (main injection timing and rail pressure, primarily), case 3 was run by fixing the appropriate lever positions in the respective models for NOx, smoke, and gisfc to those of case 1 (or "ideal" fuel). The advanced timing and a marginal increase in rail pressure brings the fuel consumption within 1% close (see FIG. 5) to that of the "ideal" fuel, but causes a significant increase in the NOx emission (40%) and a slight rise in the smoke as listed in Table 8.

TABLE 8

| Fuel label | H | D |
|---|---|---|
| T50 (° C.) | 215.6 | 288.3 |
| Cetane number | 46 | 44.4 |
| Slope (° C.) | 73.9 | 63.9 |
| Engine-out NOx (normalized) | 0.41 | 0.56 |
| Engine-out smoke (normalized) | 0.22 | 0.28 |

These results indicate a significant enhancement in the NOx-gisfc tradeoff through the use of an "ideal" fuel blend. The NOx benefit in-turn, can be leveraged (with further optimization) to slightly increase the EGR rate and advance the main injection timing to enhance fuel efficiency. At a "cruise" operating condition such as the one chosen here to run the engine experiments, these fuel consumption enhancements can be a substantial improvement to the fuel tank mileage.

Figure 18:
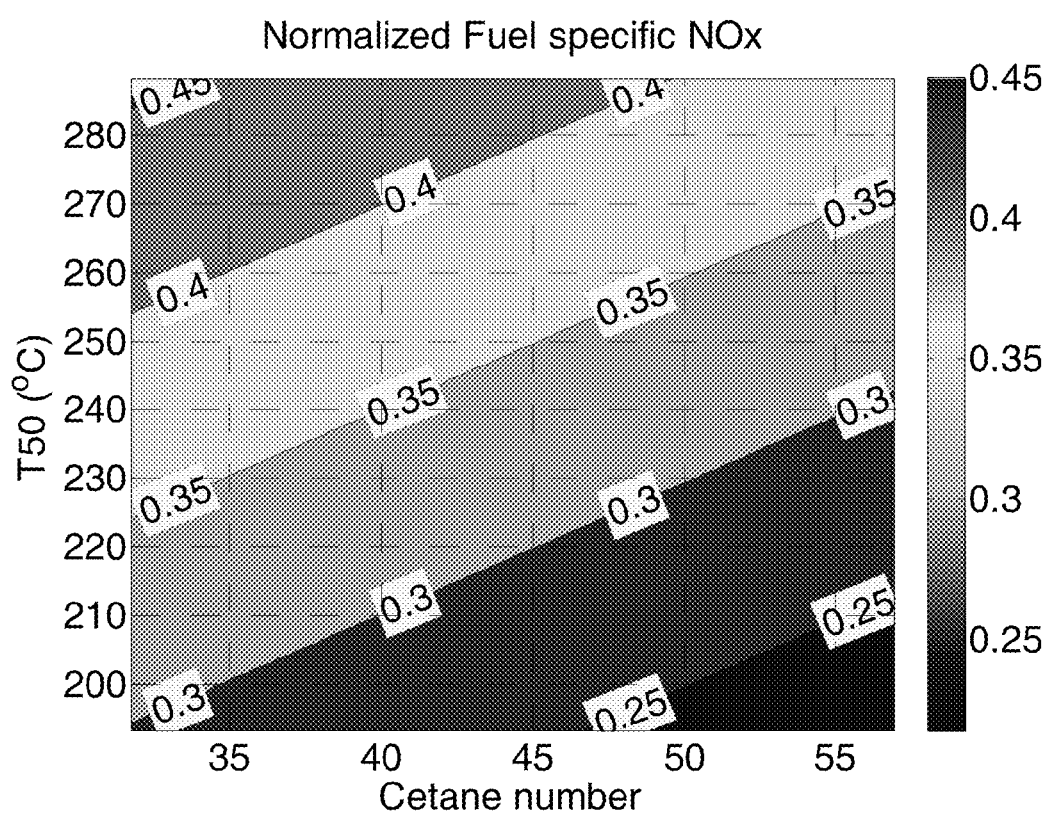

In the present section, the models described earlier are used to analyze trends relating engine behavior to fuel properties and engine control levers. FIGS. 17-21 provide contour plots for the normalized forms of NOx, smoke, and gisfc as a function of select variables or first-order model terms identified to have the strongest effect on each of them as identified in FIGS. 2-4. It should be understood that the model parameters which are not a part of the x- or the y-axes have been fixed at the optimal settings for the "ideal" fuel provided in Table 7. A contour plot of NOx as a function of intake $O_2$ concentration and T50 (FIG. 17) confirms a strong relationship between NOx and EGR. A lower T50 causes NOx to go down, though not as sharply as with EGR. FIG. 18 shows the variation of NOx as a function of cetane number and T50. A combination of lowering T50 and increasing cetane number appears to provide a significant reduction moving from the top left hand corner of the plot (high T50 and low cetane) to the bottom right hand region. In general, the effect of T50 appears to be stronger than that of cetane.

Figure 19:
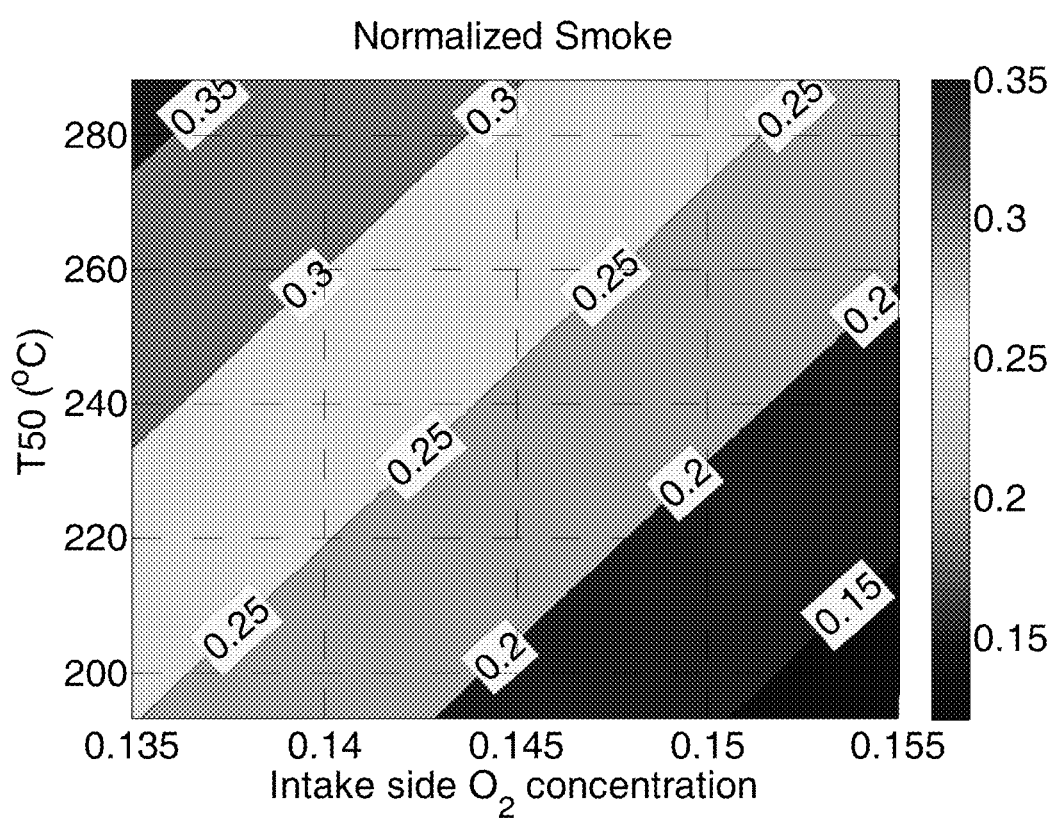
Figure 20:
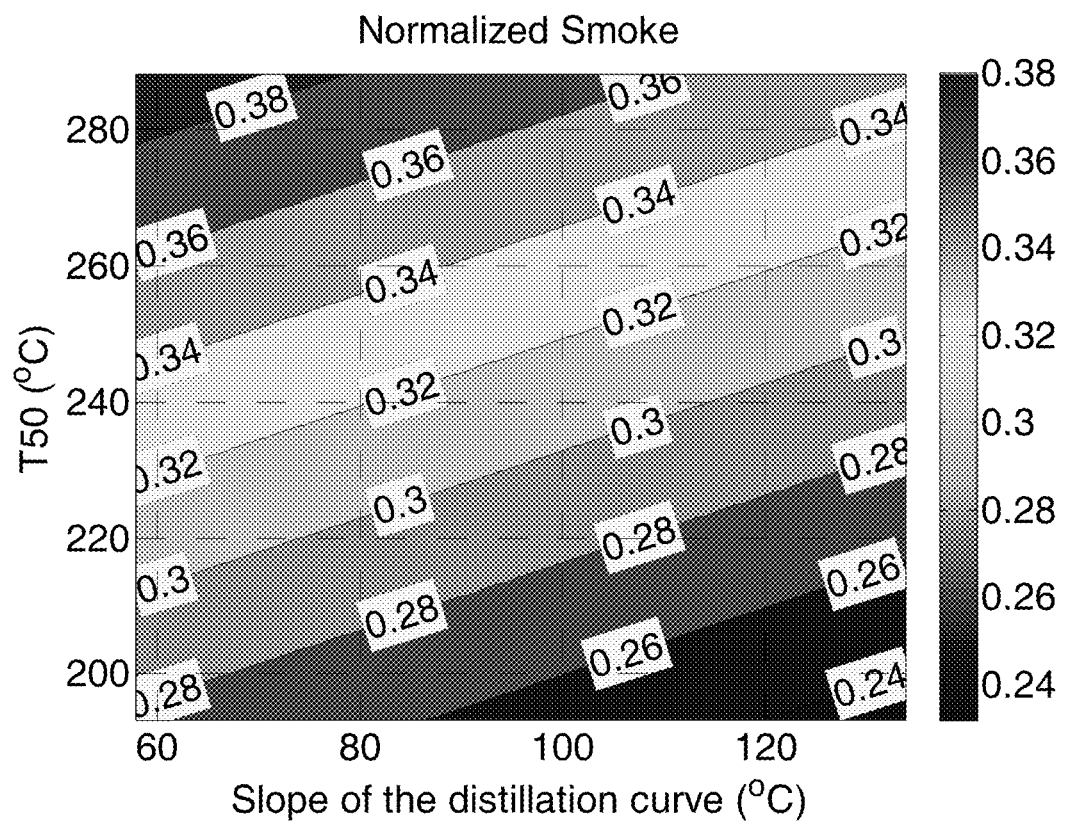

FIG. 19 represents the variation of smoke as a function of intake $O_2$ and T50. Similar to the trend in NOx, a reduction in T50 suggests a smoke benefit. The influence of EGR on the other hand, is opposite to that seen for NOx: higher intake $O_2$ fractions (and hence lower EGR rates) contribute to lower smoke emissions attributed to enhanced oxygen availability for the soot combustion. The distillation slope of the fuel appears to have a minor effect on smoke emission (see FIG. 20). Steeper boiling curves provide a smoke benefit which is much weaker to that of T50.

Figure 21:
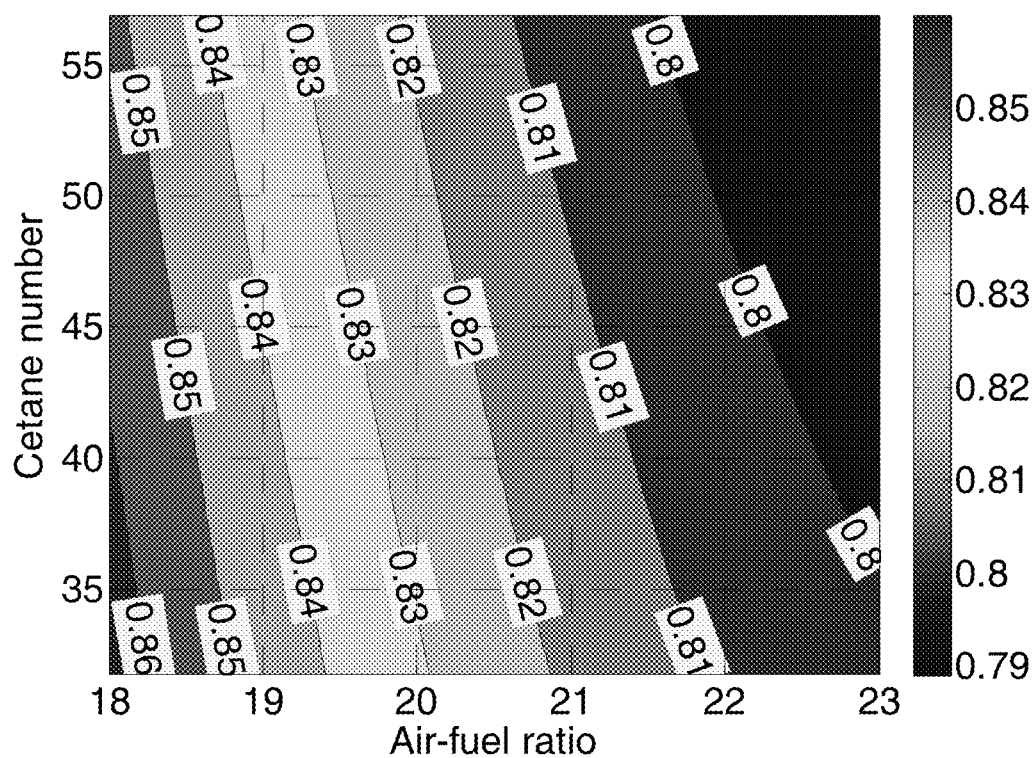

Recall from FIG. 4 that the regression model for gisfc is dominated by the engine control variables over the fuel properties. Cetane number and to a smaller extent, the distillation slope were identified as the significant first order terms in the gisfc model. FIG. 21 shows the variation of gisfc as a function of air-fuel ratio and cetane number. A change in the former spanning 18-23 causes gisfc to go down by nearly 6.5% moving from the left to the right of the plot. A change in cetane level going up from 31.8 to 56.9 corresponding to the extreme levels chosen for the fuels design, shows only a small direct benefit (around 1%) on gisfc. Observe that the experimental fuels have slightly varying heating values listed in Table 2. It is noteworthy that while the difference in the heating value between the two extremes (fuels C and D) is a rather significant 3.7%, the difference in gisfc tracked by the present model does not suggest such large deviations.

Figure 22:
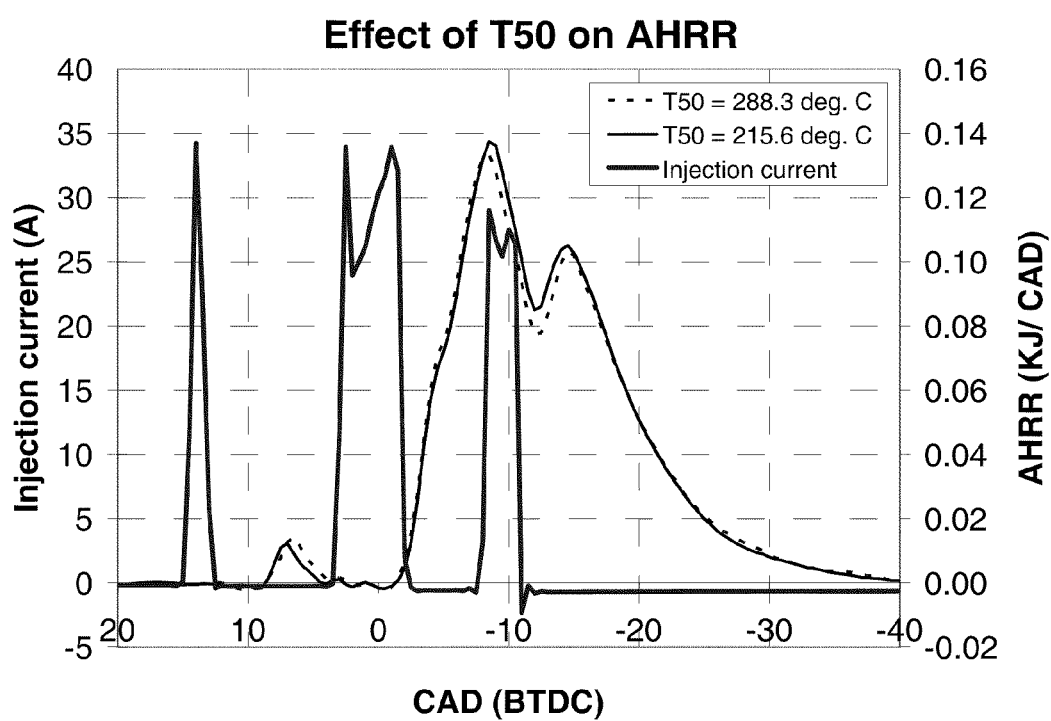
FIG. 22 is a graph depicting AHRR vs. CAD for two fuels differing widely only in T50.

To assess the effect of fuel properties on apparent heat release rate (AHRR) and also confirm their relations to engine-out emissions, a comparison was done between select data points from two fuels differing significantly only in cetane or T50 characteristics, and having close engine operating parameters between them. Table 8 compares fuels H and D, with almost identical cetane and slope values, but differing appreciably in their T50. FIG. 22 shows AHRR as a function of crank angle for these two fuels superposed with the injection current trace representing the timing of the fueling events. The injection current profile is identical between the two fuels. From the table and the regression models, a reduction in T50 (going from fuel D to H) causes both NOx and smoke to decrease. The AHRR traces in FIG. 22 represent 100 cycle averages for the two test points, and appear rather close. The heat release traces associated with either fuel commences before the electrical end-of-injection instant suggesting a diffusion flame dominant nature for the combustion process. There are some differences in the phasing and the magnitude of the peak heat release associated with the pilot combustion—i.e. the fuel with the higher T50 exhibits a higher peak for the pilot combustion event at a slightly delayed phasing. The differences in the heat release characteristics for the main and post combustion events are considered minor, indicating that performance variations between these fuels are not entirely explained by differences in combustion characteristics.

Similarly, Table 9 compares two fuels with identical T50 and slope, but significantly different cetane number.

TABLE 9

| Fuel label | F | Baseline |
|---|---|---|
| T50 (° C.) | 253.9 | 255.0 |
| Cetane number | 56.9 | 44.8 |
| Slope (° C.) | 104.4 | 102.8 |
| Engine-out NOx (normalized) | 0.17 | 0.19 |

The marginal drop in NOx with a higher cetane fuel is consistent with the model results presented in FIGS. 2 and 18. The AHRR traces for the two points in FIG. 23 indicate some differences in the combustion behavior between the fuels. The higher cetane fuel provides an almost indiscernible reduction in the ignition delay and hence a marginally advanced start of combustion for the main fueling event. Owing primarily to the diffusion dominated nature of the main combustion event, the differences here are much less pronounced than those involving premixed combustion. It should also be appreciated the distinct and near-identical slope changes (for both fuels) in the front-end of the heat release shortly after the start of the main combustion event and the closely matching profiles near their respective peaks. There are some deviations in the AHRR between the two fuels during the expansion process. Overall, the impact of T50 and cetane number on the heat release behavior is not significant, possibly suggesting the role of combustion chemistry in driving the NOx and smoke changes.

Because the present experimental work was conducted on the same engine as that used in earlier work concerning fuels with different cetane numbers, complementing the results from the current work with their NOx data which was gathered at select speed-load conditions using two diesel fuel blends (with cetane levels of 45 and 51) enables a more complete understanding of the cetane number-NOx relationship across the engine operating map. The NOx model described previously was used to simulate conditions close to those used previously by fixing the appropriate engine and fuel parameters. The numbers inputted in the model as listed in Table 10 point to relatively low EGR levels; the timing, rail pressure and other settings used in the prior work lies well within the "space" covered by the present engine experiments.

TABLE 10

| | Value |
|---|---|
| INDEPENDENT VARIABLES (Engine controls) | |
| Air-fuel ratio | 23.00 |
| Intake $O_2$ fraction | 0.155 |
| Rail pressure (bar) | 1750 |
| Main injection timing (deg. BTDC) | 6.00 |
| Pilot quantity (injector ontime in ms) | 0.15 |
| Pilot to main separation (ms) | 1.90 |
| INDEPENDENT VARIABLES (Fuel properties) | |
| T50 (deg. C.) | 255.0 |
| Cetane number | 45 and 51 |
| Distillation slope (deg. C.) | 100.74 |

Figure 24:
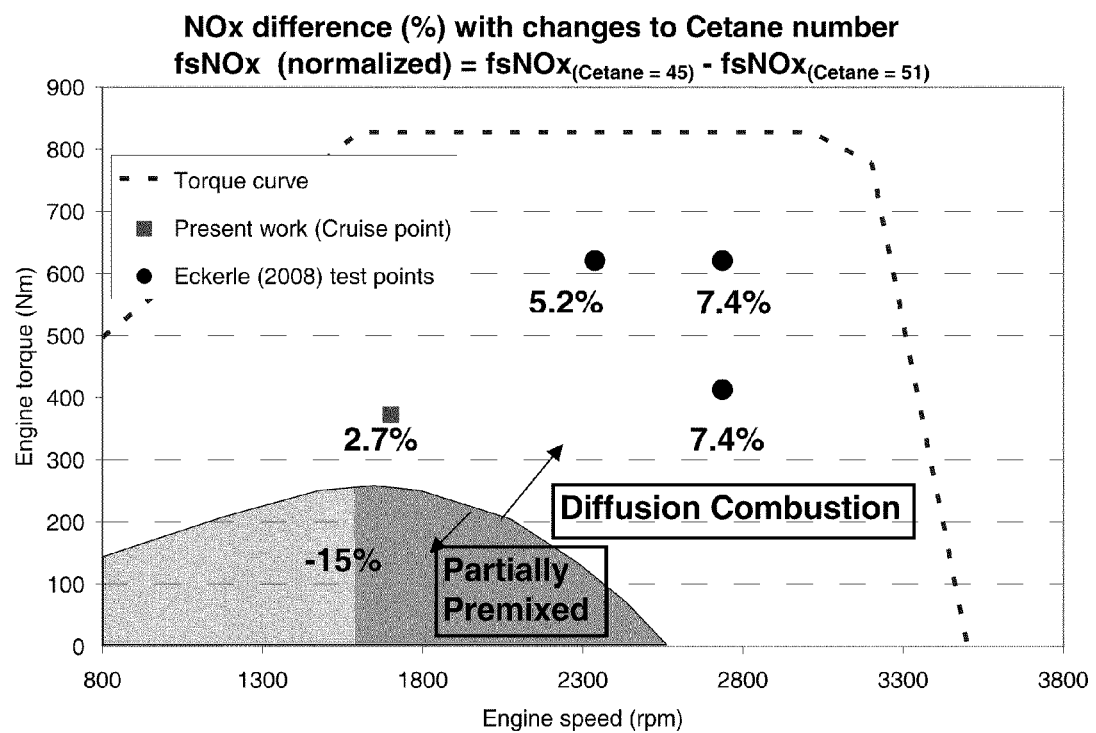
FIG. 24 is a graph depicting distribution of the NOx change due to cetane increase.

Two runs were conducted at different cetane levels of 45 and 51, and the differences in NOx going from a lower to higher cetane are mapped out at five speed-load conditions plotted in FIG. 24—four of which are derived from the earlier work. Note however, that the engine experiments for the earlier study involved single injections only unlike the three pulse fueling sequence used in the present work. However, given the relatively small contribution of pilot events to NOx against the effect of EGR, main timing and T50 (refer FIG. 2), the comparisons are still valid. FIG. 24 shows the clear distinction between the drop in NOx with elevated cetane number at higher loads vs. the corresponding increase at lighter loads. Given the placement of the test condition selected for the present work on the speed-torque space, the change in NOx is expected to be small approaching the boundary of the partially premixed regime. This result enables certain generalities to be drawn for the NOx behavior in view of the combustion CFD results from the prior study. Table 3 indicated that cetane number in the given fuels set is correlated to the mono-aromatic content and T50 with the poly-aromatic mass fraction. From FIG. 24 and Table 10, the small decrease in NOx with elevated cetane number can be attributed to the drop in adiabatic flame temperatures with lowering mono-aromatic content. Consistent with past studies, lowering flame temperatures may also explain the NOx drop with decreasing T50 and hence poly-aromatic hydrocarbon content. The reduction in smoke; however, is partly explained by the enhanced mixing attained with higher fuel volatility and the decrease in the availability of soot formation precursors with a drop in the mass fraction of the poly-aromatic hydrocarbon species (which track T50 in the given fuels set).

The present study has demonstrated that an "ideal" fuel using optimized engine control can achieve lower fuel consumption along with reduced NOx and smoke emission. Results from the analysis described earlier indicate that this fuel has a higher volatility than diesel #2 and elevated cetane relative to the market average in the US. These property changes have a likely impact on the refining process of this fuel blend. To achieve high volatility, the fuel typically needs a molecular form with a large fraction of the constituent hydrocarbons containing around 10-15 carbon atoms. Similarly, high cetane relates to a high paraffinic and low aromatic content. Analysis has been conducted that indicates that this "ideal" fuel can be produced in a refinery, but has to compete in the market with other products in the distillate range such as jet fuel and diesel #2. Similar to the properties of the diesel fuel used in Europe, volatility and cetane number can be higher for refineries that output more diesel fuel than gasoline. Also, using the current light cycle oil for commercial diesel blending, it is likely that refineries with hydro-cracking units are able to adapt more smoothly towards delivering more diesel with higher cetane number than those using the catalytic cracking process.

Examining Table 2, two fuels (C+ and D+) had significant volumes (5000 and 3200 ppm respectively) of the additive ethyl hexyl nitrate as the cetane improver to achieve a 10 cetane number increase over the base fuels C and D, while preserving the remaining fuel properties of the latter two. In addition to impacting the ignition quality of the fuel, ethyl hexyl nitrate ($C_8H_{17}NO_3$) added in such large quantities is also expected to participate in the combustion process through the release of $NO_2$ radical which may either undergo intermediate decomposition reactions or become an exhaust NOx emission. A comparison of the NOx between fuels D and D+ (cetane number 46 and 55.4) with additive concentrations of 0 and 3200 ppm respectively is expected to elucidate the effect of the cetane improver because these blends were run with the same engine calibration.

Figure 25:
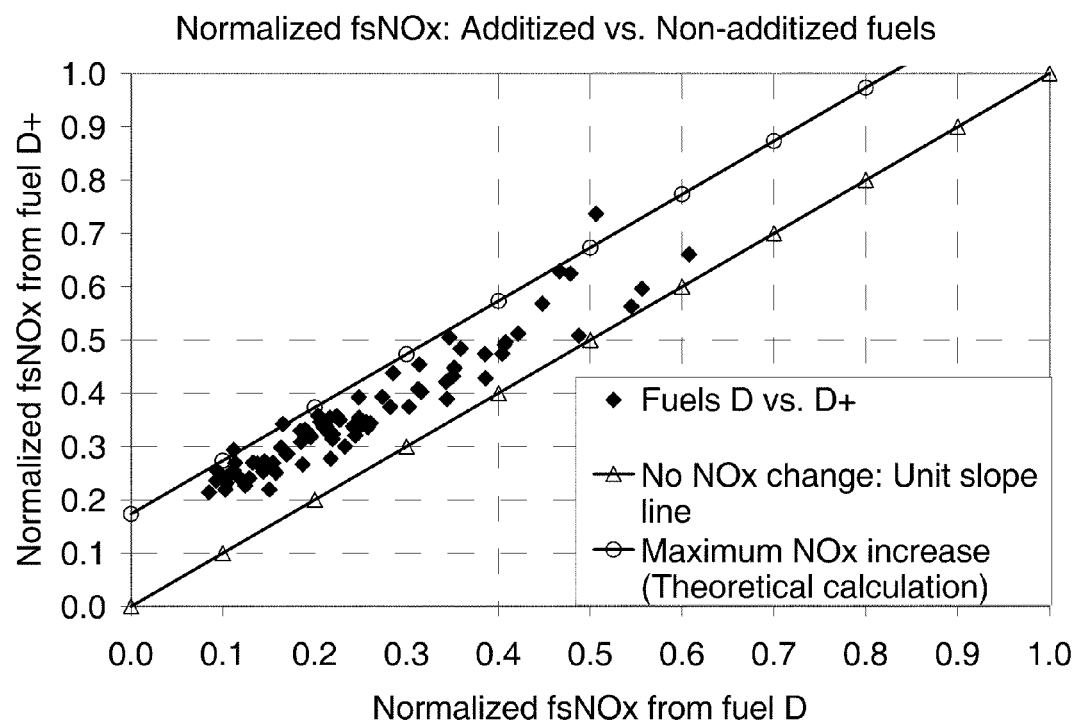
FIG. 25 is a plot of the effect of large cetane improver volumes on NOx emissions.

FIG. 25 compares normalized experimental fsNOx measurements for fuel D to that of D+. The straight line (with triangular markers) passing through the origin with a unit slope signifies the boundary of no NOx change due to the addition of the cetane improver. On the other hand, the maximum NOx increase line (circular markers) is an outcome of a simple theoretical calculation that assumes that all the nitrogen contained in the additive is released as $NO_2$. With a molecular weight of 175 g moles, $C_8H_{17}NO_3$ contains approximately 8% nitrogen by weight. Knowing the additive concentration (3200 ppm) in fuel D+, the mass of nitrogen and hence that of $NO_2$ per kg of the fuel can be easily computed. FIG. 25 suggests that the cetane improved fuel (D+) produces a higher NOx than the base fuel (D) because the data points comparing the two fuel sets lie intermediate between the 'No NOx change' line and the one representing the maximum NOx increase. From the functional dependency between cetane number and NOx obtained earlier from the model (and plotted in FIG. 18) and the fact that the distillation characteristics between fuels D and D+ are identical, this increase in NOx can be attributed to the high additive concentration, though the exact magnitude may be impacted by in-cylinder conditions. This finding is confirmed in Table 11 through a comparison in the normalized engine-out NOx levels between the two fuels at the same engine control settings.

TABLE 11

| Fuel label | D | D+ |
|---|---|---|
| T50 (° C.) | 215.6 | 217.8 |
| Cetane number | 46 | 55.4 |
| Slope (° C.) | 73.9 | 73.3 |
| Engine-out NOx (normalized) | 0.45 | 0.57 |

Figure 23:
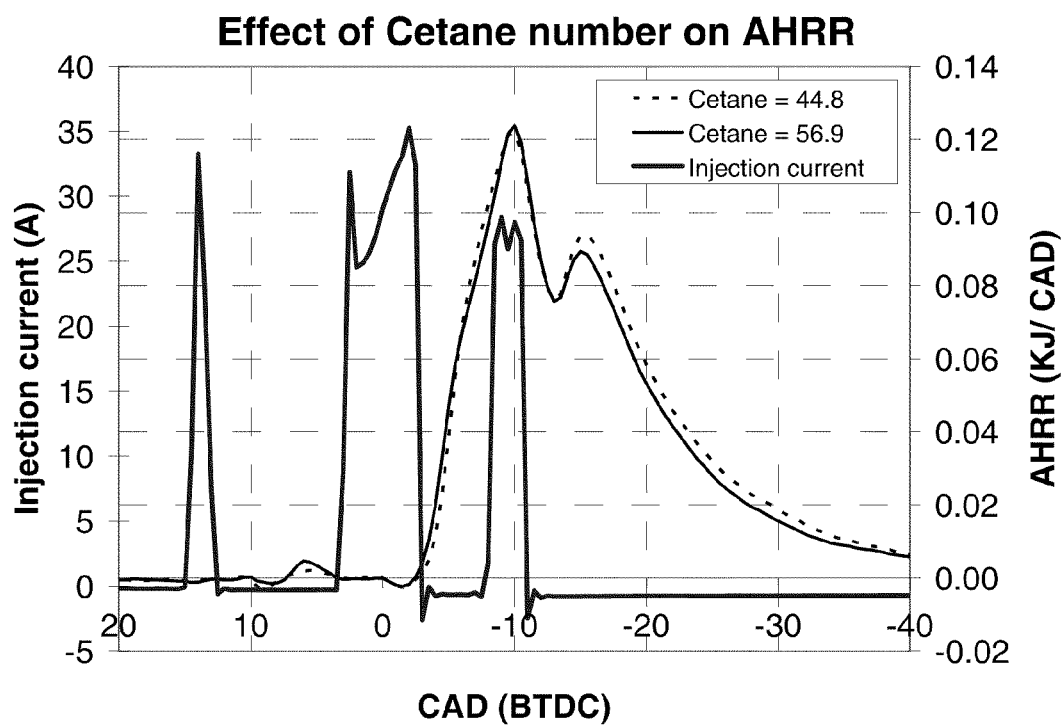
FIG. 23 is a graph depicting AHRR vs. CAD for two fuels differing widely only in cetane number.
Figure 26:
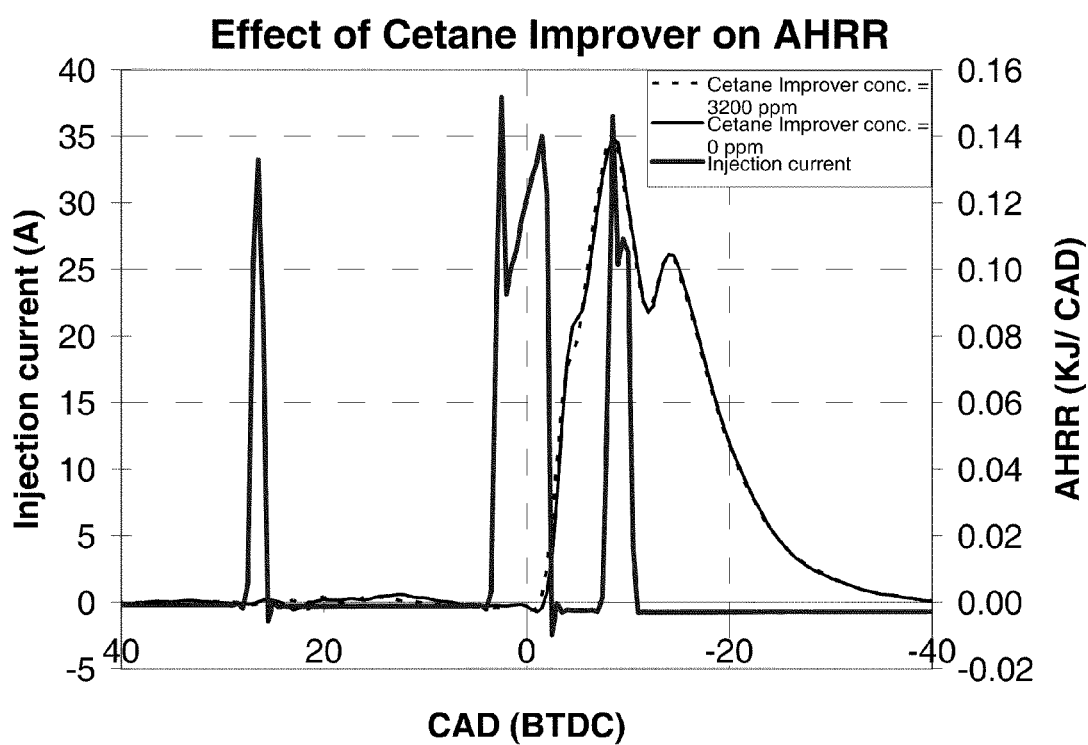
FIG. 26 is a graph depicting AHRR vs. CAD for two fuels differing widely only in cetane improver concentration.

FIG. 26 evaluates the heat release rates for the same two fuels evidencing findings similar to those in FIGS. 22-23: the differences in the heat release characteristics are quite small. On an average, the measured increase in NOx owing to the addition of $C_8H_{17}NO_3$ is around 43% (against a theoretical estimate of 68%). These values represent a significant impact on the robustness of combustion systems targeting ultra-low engine-out NOx levels.

Owing to the influence of fuel properties on the combustion, emission and fuel consumption behavior of the engine, perturbations in the former tend to impact the engine response. The magnitude of this impact depends on the engine sensitivity to a given fuel property. To quantify these effects, the mathematical models described earlier were used to simulate fluctuations to the model parameters inputting actual market ULSD fuel property data. This data included fuels sampled at various terminal outlets from October, 2006 to October, 2007. The property data spanned many commercially available diesel fuel variants: diesel #1 and 2 (which differ primarily in their distillation), premium and non-premium blends (which vary mainly in their cetane number), and a few others. The values of T50, cetane and slope from the dataset were introduced into the NOx, smoke and gisfc models keeping constant the engine control parameters which were fixed at their optimal settings (as listed in Table 6).

Figure 27:
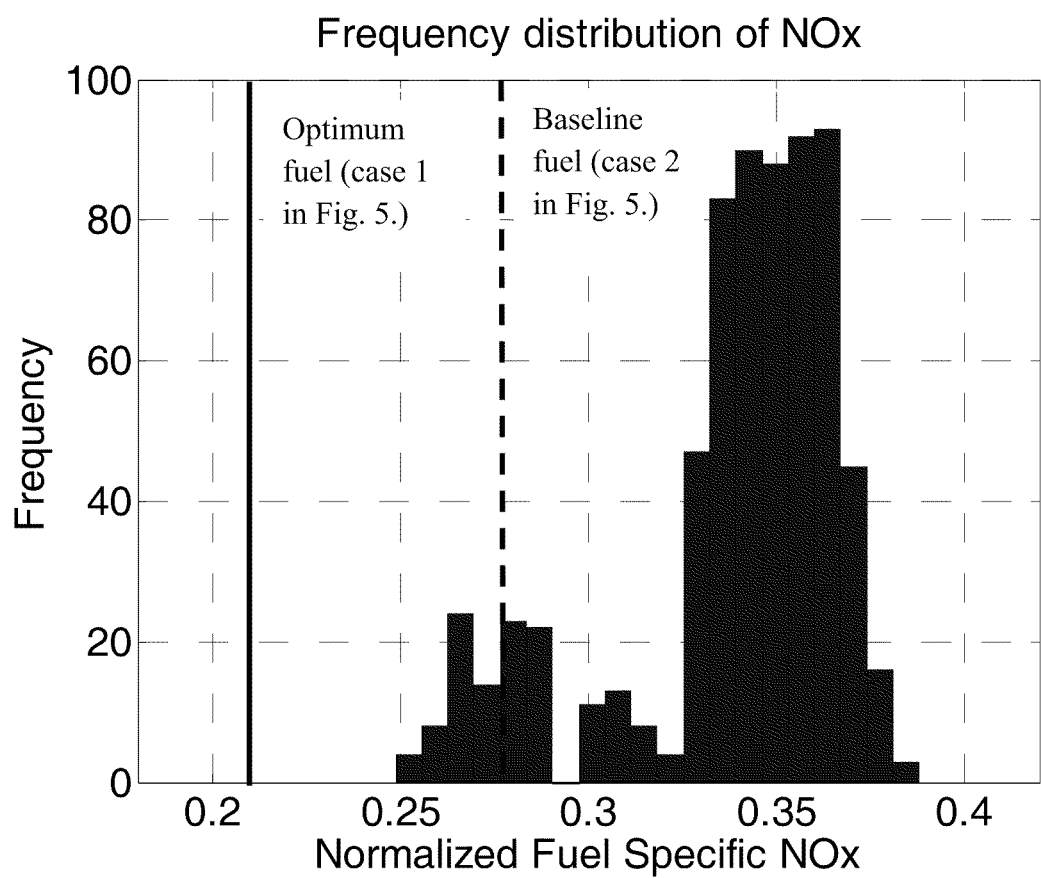
FIGS. 27-29 are graphic depictions of market fuel property-induced fluctuation in NOx, smoke, and gisfc, respectively.
Figure 28:
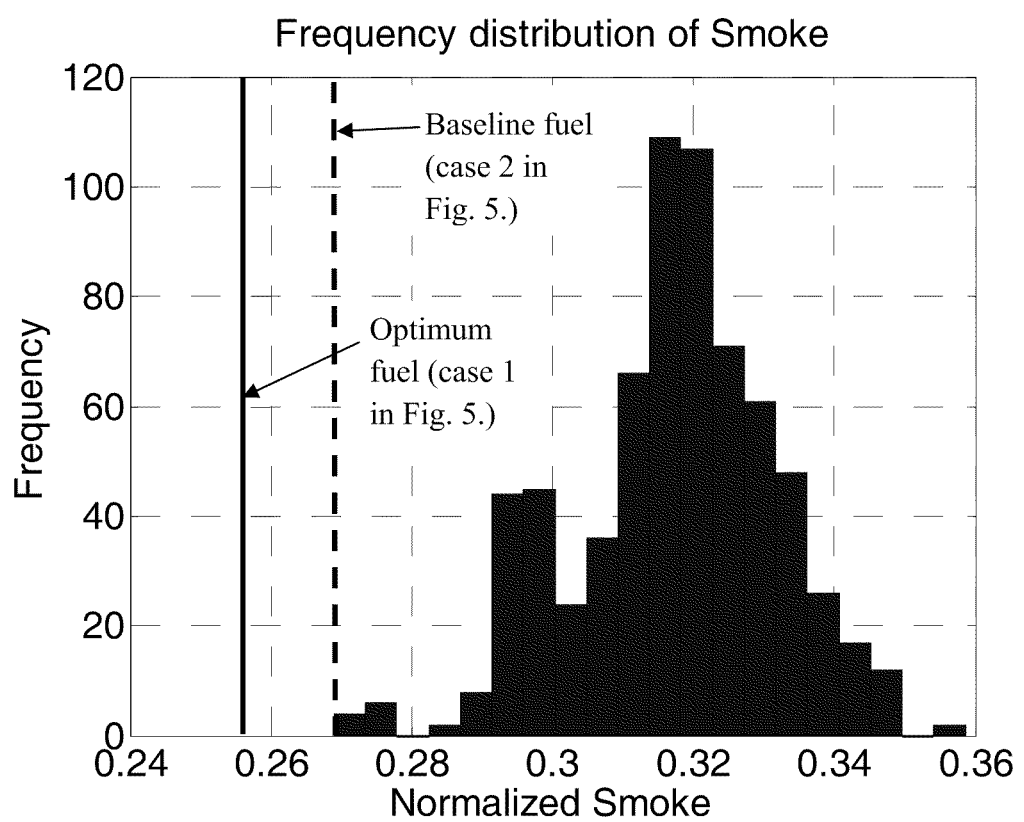
Figure 29:
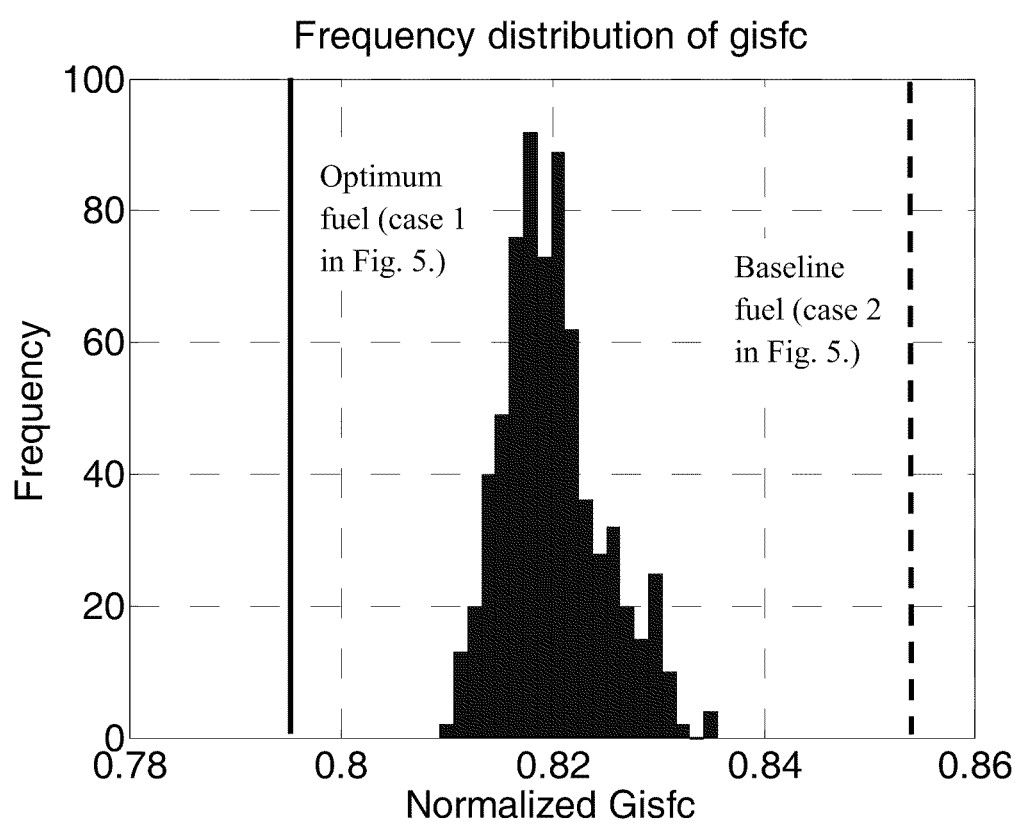

FIGS. 27-29 show frequency distributions for the normalized forms of NOx, smoke, and gisfc outlining their variation to fuel property perturbations with data from 700 fuels along with markups for the optimum and baseline fuels simulated through cases 1 and 2 respectively, in FIG. 5. Because calibration development for engines typically involves optimizing for fuel consumption using the standard diesel #2 fuel, the figures reveal the overall effect of fuel property fluctuations on salient engine responses. The frequency distributions for T50, cetane and slope, which are not shown here, suggest a Normal or Gaussian behavior but involve a small secondary peak in the spread of T50 and slope. Roughly, the deviation (maximum minus minimum divided by the mean) for T50, cetane and slope are 26, 42, and 77% respectively. These fluctuations are evident in the dispersion of engine responses in FIGS. 27-29 with their individual distributions tracking the spread of the underlying fuel properties. The corresponding deviations in NOx, smoke and gisfc are approximately 41, 28, and 3% respectively. These large and undesirable fluctuations in the engine-out emissions motivate the possible need to assess improvements in fuel property tolerances, property sensing, and potential engine control compensations needed to maintain optimal engine behavior at very low NOx levels. While the direct impact of fuel effects on gisfc may be small compared to NOx and smoke, compensating for emission drifts by modulating control levers such as air flow, EGR rate, rail pressure and injection timing may trigger a significant penalty on fuel consumption.

The changes on the engine heat release characteristics, and emissions induced by diesel fuel property variations typically deserves consideration with respect to the detection and controls compensation needed for ultra-low NOx engines. Such variations may either be leveraged to realize the benefits of "favorable" fuel properties, or to safeguard from the emissions exceeding the design targets. This approach leads into the identification of an appropriate sensor set (both "virtual" or model-based, and physical) and development of control strategies to adapt engine outputs to fuel effects. The results indicate that for the fuels studied, and the operating condition chosen for the experiments, in-cylinder pressure sensing (coupled with closed-loop combustion control) used to compute typical combustion characterization parameters such as peak cylinder pressure, CA50 and others is only partially effective to capture fuel-induced drifts.

In conclusion, the present experimental study reveals the influence of diesel fuel properties on the combustion and emissions performance of a light-duty engine operating at ultra-low NOx levels. Experiments with the 11 different diesel fuel blends were conducted at an emissions-critical "cruise" condition representing a key modal point in the FTP75 test sequence. Differentiating the effect of fuel properties and engine controls, and separating out the individual contribution of fuel volatility, ignition quality and the dispersion in the distillation temperature range (the last parameter represented by the slope of the boiling curve), the results suggest that NOx and smoke are impacted by the mid-distillation temperature and cetane number. The regression-based multivariate models developed to determine the functional relationships between engine outputs and fuel and engine control levers indicate that lower mid-distillation temperatures achieved in the present fuel design through a reduction in the fuel poly-aromatic content provides significant NOx and smoke benefits. Increasing cetane number, which correlates with lowering mono-aromatic content, provides a small NOx benefit. NOx also appears to decrease with lower total aromatic content.

In some implementations, the reduction in smoke may be partly associated with enhanced mixing achieved with the higher fuel volatility and also the underlying chemical mechanisms governing the decomposition of the poly aromatics into soot precursors. The direct influence of fuel properties on gross indicated fuel consumption appears to be small, but significant indirect benefits can accrue from the simultaneous calibration for emissions and fuel consumption leveraging the "favorable" fuel properties. The effect of fuel properties on select heat release characteristics such as peak cylinder pressure and combustion phasing is not significant as seen from the regression models and the heat release traces. A simultaneous optimization conducted to identify the combination of fuel property values and engine control settings for the best NOx-gisfc tradeoff indicates significant fuel consumption and NOx improvements to the extent of approximately 7 and 20% respectively from that of the baseline ULSD fuel. (See FIG. 5 and accompanying text.)

One aspect of the present invention is a method which includes: providing an internal combustion engine and a controller to regulate operation of the engine where the engine is able to combust a fuel to produce an exhaust gas; establishing a plurality of fuel property inputs; establishing a plurality of engine performance inputs; generating engine control information as a function of the fuel property inputs and the engine performance inputs; and accessing the engine control information with the controller to regulate at least one engine operating parameter.

Features of this aspect include engine performance inputs being at least one of the following: a fuel amount per cylinder, a fuel timing, a ratio between fuel and air, a fuel pressure, a gas temperature, a gas pressure, an EGR flow, an oxygen content of an engine gas flow, an engine speed, and an engine load; the engine operating parameter being at least one of the following: an exhaust composition, a fuel consumption measure, an unburned hydrocarbon level, an engine gas temperature, an engine gas pressure, an engine gas flow rate, and an engine combustion noise level; the fuel property inputs being at least one of the following: a distillation value, such as a T10 value, a T90 value, a T50 value, and a distillation slope, for the fuel and a cetane number of the fuel; and the engine control information being generated to reduce an engine operating output such as an NOx content of the exhaust gas, soot content of the exhaust gas, fuel consumption, and various combinations. Optionally, the method may include storing the engine control information in a memory of the controller, calibrating operation of the engine with the engine control information, and updating the engine control information during operation of the engine in response to a change in at least one of the fuel property inputs.

Further features may include the fuel property inputs having a first one of the fuel property inputs corresponding to a distillation temperature, a second one of the fuel property inputs corresponding to a cetane number, and a third one of the fuel property inputs corresponding to a distillation slope. Generating the engine control information for the method may further include: determining an observed engine response corresponding to at least one of the engine operating parameters; applying a mathematical model to the fuel property inputs and the engine performance inputs to determine a predicted engine response; performing a comparison of the observed engine response and the predicted engine response; and determining the function of the fuel property inputs and the engine performance inputs in response to the comparison.

Another aspect of the present invention includes a system with an internal combustion engine operable to produce power through combustion of a fuel; a controller to regulate operation of the engine, the controller being able to: (a) access information corresponding to a plurality of fuel property inputs and a plurality of engine performance characteristics such as a fuel amount per cylinder, a fuel timing, a ratio between fuel and air, a fuel pressure, a gas temperature, a gas pressure, an EGR flow, an oxygen content of an engine gas flow, an engine speed, and an engine load; and (b) generate one or more engine output signals as a function of the fuel property inputs and the engine performance characteristics; and one or more engine controls responsive to the one or more engine output signals to regulate at least one engine operating parameter such as an exhaust composition, a fuel consumption measure, an unburned hydrocarbon level, an engine gas temperature, an engine gas pressure, an engine gas flow rate, and an engine combustion noise level.

Further features of the information or at least a portion of the information may include being stored in a memory, corresponding to at least one calibration value for the engine, and being provided by one or more engine sensors operatively coupled to the controller. Further features of the system may include a turbocharger. Further features of the engine may include a multiple cylinder, reciprocating piston type with fuel injection and is structured to operate with the fuel being of a diesel type.

A further feature of the system may include the controller generating the one or more engine output signals by determining an observed engine response corresponding to at least one engine operating parameter; applying a mathematical model to the fuel property inputs and the engine performance characteristics to determine a predicted engine response; performing a comparison of the observed engine response and the predicted engine response; determining the function of the fuel property inputs and the engine performance characteristics in response to the comparison.

Yet another aspect of the present invention includes a system with an internal combustion engine operable to produce power through combustion of a fuel; a controller to regulate operation of the engine, the controller being structured to operate a means for generating one or more engine calibrating parameters as a function of a plurality of fuel property inputs and a plurality of engine performance characteristics; a means for optimizing one or more engine operating parameters, the engine operating parameters corresponding to at least one of: an exhaust composition, a fuel consumption, an unburned hydrocarbon level, an engine gas temperature, an engine gas pressure, an engine gas flow rate, and an engine combustion noise level in response to at least one of the engine calibration parameters in response to at least one of the engine calibrating parameters; and a means for changing at least one engine operating parameter in response to the optimization.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any following claims are desired to be protected.

What is claimed is:

1. A method, comprising:
   providing an internal combustion engine and a controller to regulate operation thereof, the engine being operable to combust fuel to produce exhaust;
   determining a plurality of fuel property inputs, a first one of the fuel property inputs being representative of a distillation temperature value of the fuel and a second one of the fuel property inputs being representative of a cetane number of the fuel;
   determining a plurality of engine performance inputs;
   generating engine control information as a function of the fuel property inputs and the engine performance inputs, wherein generating the engine control information further includes:
      determining an observed engine response corresponding to at least one engine operating parameter;
      determining a predicted engine response in response to the fuel property inputs and the engine performance inputs;
      comparing the observed engine response and the predicted engine response to determine the observed engine response corresponds to the fuel property inputs; and
   accessing the engine control information with the controller to regulate the engine operating parameter during engine operation in response to the comparison, the operating parameter corresponding to at least one of: an exhaust composition, a fuel consumption amount, an unburned hydrocarbon amount, an engine gas temperature, an engine gas pressure, an engine gas flow amount, and an engine combustion noise.

2. The method of claim 1, wherein the engine performance inputs each correspond to at least one selected from a group consisting of: a fuel amount per cylinder, a fuel timing, a ratio between fuel and air, a fuel pressure, a gas temperature, a gas pressure, an EGR flow, an oxygen content of an engine gas flow, an engine speed, and an engine load.

3. The method of claim 1, wherein the distillation temperature value corresponds to at least one of: a T10 value, a T90 value, and a T50 value.

4. The method of claim 1, which includes operating the engine in accordance with the engine operating parameter.

5. The method of claim 1, which includes combusting the fuel with the engine, the distillation temperature value corresponding to a T50 value in the range of 190 degrees Celsius to 280 degrees Celsius and the cetane number being in a range of 31 to 60.

6. The method of claim 1, wherein a third one of the fuel property inputs corresponds to a distillation slope.

7. The method of claim 1, further including:
   storing the engine control information in a memory of the controller; and
   calibrating operation of the engine with the engine control information.

8. The method of claim 1, wherein the engine control information is used to reduce an engine operating output selected from a group consisting of: a NOx content of the exhaust gas, soot content of the exhaust gas, fuel consumption, and combinations thereof.

9. The method of claim 1, which includes updating the engine control information during operation of the engine in response to a change in at least one of the fuel property inputs.

10. A method, comprising:
    operating an internal combustion engine;
    during operation of the engine, detecting an observed engine response corresponding to at least one of: engine emission content, engine fuel consumption, an engine pressure, an engine flow rate, and an engine temperature;
    determining a distillation value and a cetane number of a fuel for the engine;
    interpreting one or more observed engine performance characteristics;
    determining a prediction of the engine response as a function of the distillation value and the cetane number of the fuel and the one or more observed engine performance characteristics;
    performing a comparison of the observed engine response and the prediction of the engine response to determine the observed engine response corresponds to the distillation value and the cetane number of the fuel; and
    adjusting operation of the engine based on the comparison.

11. The method of claim 10, which includes a controller operatively coupled to a number of engine sensors and a number of engine actuators, the controller configured to adjust operation of the engine after performing the comparison.

12. The method of claim 10, wherein the distillation value is one of T10, T90, T50, and a distillation slope.

13. The method of claim 12, wherein the first one of the one or more properties corresponds to a T50 between 190 degrees Celsius and 280 degrees Celsius and the second one of the one or more properties corresponds to a cetane number between 31 and 60.

14. The method of claim 10, wherein the observed engine response and the predicted engine response are representative of at least one of: NOx content of the exhaust, smoke content of the exhaust, combustion noise, and fuel consumption.

15. The method of claim 10, which includes providing at least one of the one or more observed engine performance characteristics with a sensor and wherein the adjusting is performed with one or more actuators.

16. An apparatus, comprising:
    an internal combustion engine operable to produce power through combustion of a fuel;
    a controller to regulate operation of the engine, the controller being operable to: (a) access information corresponding to a number of fuel properties and a number of engine performance characteristics, wherein the number of fuel properties include a distillation value for the fuel and a cetane number of the fuel, and wherein the number engine performance characteristics is representative of at least one of: fuel amount per cylinder, fuel timing, a ratio between fuel and air, a fuel pressure, a gas temperature, a gas pressure, an EGR flow, oxygen content of an engine gas flow, engine speed, and engine load; (b) predict an engine response as a function of the distillation value, the cetane number and the engine performance characteristics; (c) perform a comparison of an observed engine response and the predicted engine response to determine the observed engine response corresponds to the fuel properties; and (d) generate one or more output signals as a function of the fuel properties and the engine performance characteristics in response to the comparison; and
    one or more engine controls responsive to the one or more output signals to regulate at least one of exhaust content, fuel consumption, unburned hydrocarbon, an engine gas temperature, an engine gas pressure, an engine gas flow rate, and engine combustion noise during engine operation.

17. The apparatus of claim 16, wherein the controller includes a memory and calibration values for the engine are stored in the memory.

18. The apparatus of claim 16, wherein the engine performance characteristics are provided by one or more engine sensors operatively coupled to the controller.

19. The apparatus of claim 16, wherein the engine includes a turbocharger.

20. The apparatus of claim 16, wherein the controller further includes means for changing at least one of the exhaust content, the fuel consumption, the unburned hydrocarbon, the engine gas temperature, the engine gas pressure, the engine gas flow rate, and the engine combustion noise in response to a change in at least one of the distillation value for the fuel and the cetane number of the fuel during engine operation.

21. The apparatus of claim 16, wherein the engine is of a multiple cylinder, reciprocating piston type with fuel injection and is structured to operate with the fuel being of a diesel type.

22. An apparatus, comprising:
    an internal combustion engine operable to produce power through combustion of a fuel;
    a controller to regulate operation of the engine, the controller being operable to: (a) access information corresponding to a number of fuel properties including a distillation value, a cetane number of the fuel, and a number of engine performance characteristics, (b) detect observed engine response corresponding to at least one of: exhaust content, fuel consumption, unburned hydrocarbon, an engine gas temperature, an engine gas pressure, an engine gas flow rate, and engine combustion noise during engine operation, (c) predict an engine response as a function of the distillation value, the cetane number and the observed engine characteristics, (d) perform a comparison of the observed engine response and the predicted engine response to determine the observed engine response corresponds to the fuel properties, (e) generate one or more output signals as a function of the fuel properties and the engine performance characteristics in response to the comparison; and
    one or more engine controls responsive to the one or more output signals to adjust the observed engine response.

23. The apparatus of claim 22, wherein the controller includes a memory and the fuel properties are stored in the memory.

24. The apparatus of claim 22, wherein the engine performance characteristics are provided by one or more engine sensors operatively coupled to the controller.

25. The apparatus of claim 22, wherein the controller includes means for applying calibration data.

26. The apparatus of claim 22, wherein the engine includes a turbocharger and the engine is of a multiple cylinder, reciprocating piston type with fuel injection and is structured to operate with the fuel being of a diesel type.

27. The apparatus of claim 23, wherein the controller includes means for optimizing one or more constituents of the exhaust content and the fuel consumption.

28. A system comprising:
    an internal combustion engine operable to produce power through combustion of a fuel;
    a controller to regulate operation of the engine, the controller being structured to operate:
    a means for generating one or more engine calibrating parameters as a function of a distillation value and a cetane number of the fuel and a plurality of engine performance characteristics;
    a means for optimizing one or more engine operating parameters, the engine operating parameters corresponding to at least one of: an exhaust composition, a fuel consumption, an unburned hydrocarbon level, an engine gas temperature, an engine gas pressure, an engine gas flow rate, and an engine combustion noise level in response to at least one of the engine calibration parameters; and
    a means for changing at least one engine operating parameter in response to the optimization.

* * * * *